US011522904B2

(12) United States Patent
McArdle et al.

(10) Patent No.: US 11,522,904 B2
(45) Date of Patent: Dec. 6, 2022

(54) SELF-HEALING ARCHITECTURE FOR RESILIENT COMPUTING SERVICES

(71) Applicant: Architecture Technology Corporation, Minneapolis, MN (US)

(72) Inventors: Daniel McArdle, Seneca Falls, NY (US); Judson Powers, Ithaca, NY (US); Robert A. Joyce, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 543 days.

(21) Appl. No.: 16/712,576

(22) Filed: Dec. 12, 2019

(65) Prior Publication Data
US 2020/0120130 A1  Apr. 16, 2020

Related U.S. Application Data

(63) Continuation of application No. 15/604,850, filed on May 25, 2017, now Pat. No. 10,554,685.

(51) Int. Cl.
*H04L 29/06* (2006.01)
*H04L 9/40* (2022.01)
(Continued)

(52) U.S. Cl.
CPC ........ *H04L 63/1441* (2013.01); *G06F 9/4406* (2013.01); *G06F 9/45504* (2013.01);
(Continued)

(58) Field of Classification Search
CPC ............. H04L 63/1441; H04L 63/0272; H04L 63/1425; G06F 9/4406; G06F 9/45504;
(Continued)

(56) References Cited

U.S. PATENT DOCUMENTS 5,644,710 A  7/1997 Johnson et al.
5,889,992 A  3/1999 Koerber
(Continued)

FOREIGN PATENT DOCUMENTS

EP  2884392  6/2015

OTHER PUBLICATIONS

"Apache Core Features," retrieved on Jul. 14, 2016, from http://httpd.apache.org/docs/2.4/mod/core.html#servertokens, 73 pp.
(Continued)

*Primary Examiner* — Harunur Rashid
(74) *Attorney, Agent, or Firm* — Shumaker & Sieffert, P.A.

(57) ABSTRACT

For each respective virtual machine (VM) of a plurality of VMs, a distributed computing system generates a unique Application Binary Interface (ABI) for an operating system for the respective VM, compiles a software application to use the unique ABI, and installs the operating system and the compiled software application on the respective VM. A dispatcher node dispatches, to one or more VMs of the plurality of VMs that provide a service and are in the active mode, request messages for the service. Furthermore, a first host device may determine, in response to software in the first VM invoking a system call in a manner inconsistent with the unique ABI for the operating system of the first VM, that a failover event has occurred. Responsive to the failover event, the distributed computing system fails over from the first VM to a second VM.

20 Claims, 7 Drawing Sheets

(51) Int. Cl.
*G06F 9/4401* (2018.01)
*G06F 9/455* (2018.01)
*G06F 11/20* (2006.01)
*G06F 8/41* (2018.01)
*G06F 8/61* (2018.01)

(52) U.S. Cl.
CPC ........ *G06F 11/203* (2013.01); *H04L 63/0272* (2013.01); *H04L 63/1425* (2013.01); *G06F 8/41* (2013.01); *G06F 8/61* (2013.01); *G06F 2201/805* (2013.01); *G06F 2201/815* (2013.01)

(58) Field of Classification Search
CPC . G06F 11/203; G06F 8/41; G06F 8/61; G06F 2201/805; G06F 2201/815; G06F 11/1446; G06F 11/1438; G06F 11/202; G06F 11/2048; G06F 11/1484; G06F 2009/4557; G06F 2009/45575; G06F 9/45558
See application file for complete search history.

(56) References Cited

U.S. PATENT DOCUMENTS

| | | |
|---|---|---|
| 7,076,801 B2 | 7/2006 | Gong et al. |
| 7,134,123 B1 | 11/2006 | Berry et al. |
| 7,350,234 B2 | 3/2008 | Goseva-Popstojanova et al. |
| 7,472,249 B2 | 12/2008 | Cholleti et al. |
| 7,607,129 B2 | 10/2009 | Rosu et al. |
| 8,510,747 B2 | 8/2013 | Tian et al. |
| 8,640,238 B2 | 1/2014 | Brueckner et al. |
| 8,799,422 B1 | 8/2014 | Qu et al. |
| 8,839,426 B1 | 9/2014 | Brueckner et al. |
| 9,094,449 B2 | 7/2015 | Brueckner et al. |
| 9,473,526 B2 | 10/2016 | Brueckner et al. |
| 9,665,349 B2 | 5/2017 | Savage et al. |
| 9,740,703 B2* | 8/2017 | Lim ................... G06F 21/6218 |
| 9,910,721 B2 | 3/2018 | Wu et al. |
| 10,007,498 B2 | 6/2018 | Powers et al. |
| 10,200,401 B1 | 2/2019 | Powers et al. |
| 10,200,406 B1 | 2/2019 | Powers et al. |
| 10,284,592 B1 | 5/2019 | Powers et al. |
| 10,402,179 B1 | 9/2019 | Powers et al. |
| 10,412,114 B1 | 9/2019 | Powers et al. |
| 10,412,116 B1 | 9/2019 | Powers et al. |
| 2003/0217126 A1 | 11/2003 | Polcha et al. |
| 2004/0062204 A1 | 4/2004 | Bearden |
| 2005/0198303 A1 | 9/2005 | Knauerhase et al. |
| 2008/0086729 A1* | 4/2008 | Kondoh ................ G06F 9/5077 718/1 |
| 2008/0263658 A1 | 10/2008 | Michael et al. |
| 2009/0007100 A1 | 1/2009 | Field et al. |
| 2009/0313620 A1 | 12/2009 | Sedukhin et al. |
| 2010/0043073 A1 | 2/2010 | Kuwamura |
| 2010/0185596 A1 | 7/2010 | Dee |
| 2010/0269167 A1 | 10/2010 | Kashima |
| 2011/0142053 A1 | 6/2011 | Van Der Merwe et al. |
| 2012/0042365 A1 | 2/2012 | Shoval et al. |
| 2012/0110570 A1 | 5/2012 | Jacobson et al. |
| 2012/0204193 A1* | 8/2012 | Nethercutt .......... G06F 11/3495 719/330 |
| 2012/0259816 A1 | 10/2012 | Cargille et al. |
| 2013/0007693 A1 | 1/2013 | Bliss et al. |
| 2013/0054734 A1 | 2/2013 | Bond et al. |
| 2013/0055256 A1 | 2/2013 | Banga et al. |
| 2013/0097603 A1 | 4/2013 | Amano et al. |
| 2013/0166703 A1 | 6/2013 | Hammer et al. |
| 2013/0191340 A1 | 7/2013 | Ammanur et al. |
| 2013/0227710 A1 | 8/2013 | Barak et al. |
| 2014/0096134 A1 | 4/2014 | Barak et al. |
| 2014/0157407 A1 | 6/2014 | Krishnan et al. |
| 2014/0310810 A1 | 10/2014 | Brueckner et al. |
| 2015/0033221 A1 | 1/2015 | Chari et al. |
| 2015/0046405 A1 | 2/2015 | Brueckner et al. |
| 2015/0106872 A1 | 4/2015 | Hiser et al. |
| 2015/0180721 A1* | 6/2015 | Kapadia .............. H04L 12/4625 370/400 |
| 2015/0277867 A1 | 10/2015 | Hasabnis et al. |
| 2015/0309831 A1 | 10/2015 | Powers et al. |
| 2015/0334130 A1 | 11/2015 | Brueckner et al. |
| 2016/0364276 A1* | 12/2016 | Wu ....................... G06F 9/4552 |
| 2017/0094034 A1 | 3/2017 | Banerjee et al. |
| 2017/0177314 A1 | 6/2017 | Powers et al. |

OTHER PUBLICATIONS

"ARM architecture," Aug. 1, 2016, retrieved from https://en.wikipedia.org/wiki/ARM_architecture, 23 pp (retrieved on Aug. 3, 2016).
"DOD Needs to Better Support Program Managers' Implementation of Anti-Tamper Protection," Defense Acquisitions, GAO, United States General Accounting Office, Mar. 2004, 25 pp.
"dtrace.org," retrieved on Jul. 14, 2016, from http://dtrace.org/, 2 pp.
"Google Code Archive—Long-term storage for Google Code Project Hosting," retrieved on Jul. 14, 2016, from https://code.google.com/archive/p/volatility/wikis/LinuxMemoryForensics.wiki, 4 pp.
"Home," obfuscator, retrieved on Jul. 14, 2016, from https://github.com/obfuscator-llvm/obfuscator/wiki, Nov. 17, 2015, 1 pp.
"Honeynet Project," retrieved on Jul. 14, 2016, from https://en.wikipedia.org/wiki/Honeynet_Project, 2 pp.
"Honeypot (computing)," retrieved on Jul. 14, 2016, from https://en.wikipedia.org/wiki/Honeypot_(computing), 6 pp.
"IDA: About," retrieved on Jul. 14, 2016, from https://www.hex-rays.com/products/ida/, 1 pp.
"Install SharePoint 2013 across multiple servers for a three-tier farm," SharePoint 2013, Jul. 16, 2012, 13 pp.
"Organically Assured and Survivable Information Systems (OASIS) Technology Transition Assessment (OTTA)," AFRL-IF-RS-TR-2004-67, Final Technical Report, Mar. 2004, 56 pp.
"SAFECode," retrieved on Jul. 14, 2016, from http://safecode.cs.illinois.edu/ , 1 pp.
"SHelp: Automatic Self-healing for Multiple Application Instances in a Virtual Machine Environment", Gang Chen, Hai Jin, Dequing Zou, Bing Bing Zhou, Weizhong Qiang and Gang Hu, Huazhong University of Science and Technology, Wuhan, 43 0074, China, 2010 IEEE International Conference on Cluster Computing, pp. 97-106.
"Smashing the Stack in 2011," retrieved from https://paulmakowski.wordpress.com/2011/01/25/smashing-the-stack-in-2011/, Jan. 25, 2011, 9 pp.
"SWARM, a System-Wide Application Randomization Mechanism," SIBR.gov, retrieved on Jul. 14, 2016 from https://www.sibr.gov/sibrsearch/detail/824209, 4 pp.
"The Volatility Framework," Google Code Archive—Long-term storage for Google Code Project Hosting., retrieved on Jul. 14, 2016, from https://code.google.com/p/volatility/, 1 pp.
"VMware High Availability," Easily Deliver High Availability for All of Your Virtual Machines, VMware, Inc., 2009, 2 pp.
"VMware vSphereTM 4 Fault Tolerance: Architecture and Performance," White paper, VMware, Inc., 2009, 19 pp.
Abadi et al., "On Protection by Layout Randomization," ACM Trans. Inf. Syst. Secur. 15, 2, Article 8, Jul. 2012, 39 pp.
Alberts et al., "Mission Assurance Analysis Protocol (MAAP): Assessing Risk in Complex Environments," retrieved from http://www.sei.cmu.edu/reports/05tn032.pdf, Sep. 2005, 59 pp.
Bargar, "DOD Global Information Grid Mission Assurance," CrossTalk, The Journal of Defense Software Engineering, retrieved at http://www.crosstalkonline.org/storage/issue-archives/2008/200807/200807-Bargar.pdf, Jul. 2008, 3 pp.
Barham et al., "Xen and the Art of Virtualization," University of Cambridge Computer of Laboratory, 2003, 14 pp. (Applicant points out, in accordance with MPEP 609.04(a), that the year of publication, 2003, is sufficiently earlier than the effective U.S. filing date such that the particular month of publication need not be provided).
Bodeau et al., MITRE Technical Report, "Cyber Resiliency Engineering Framework", Dec. 2011, 78 pgs.

(56) References Cited

OTHER PUBLICATIONS

Borman et al., "A Serially Reusable Java(tm) Virtual Machine Implementation for High Volume, Highly Reliable, Transaction Processing," Accessed Apr. 29, 2013, 21 pp.
Castro, et al., "Practical Byzantine Fault Tolerance and Proactive Recovery," ACM Transactions on Computer Systems (Association for Computing Machinery), vol. 20, No. 4, Nov. 2002, pp. 398-461.
Chabrow, "Intelligent Defense Against Intruders," Government Information Security, May 23, 2012, retrieved from http://www.govinfosecurity.com/interviews/intelligent-defense-against-intruders-i-1565, 1 pp.
Chew et al., "Mitigating Buffer Overflows by Operating System Randomization," Carnegie Mellon University Technical Report CMU-CS-02-197, Dec. 2002, 11 pp.
Cox, et al., "N-Variant Systems: A Secretless Framework for Security through Diversity," USENIX Security Symposium, Vancouver, BC, Aug. 3, 2006, 16 pp.
Custy et al., "Conditional Entropy for Deception Analysis," 13th ICCRTS: C2 for Complex Endeavors, Jun. 2008, 22 pp.
Cyber Kill Chain—Lockheed Martin, "Proactively Detect Persistent Threats", Retrieved Mar. 14, 2017 from http://www.lockheadmartin.com/us/what-we-do/aerospace-defence/cyber/cyber-kill-chain_html, 3 pgs.
Department of Defense Instruction, "Information Assurance (1A) Implementation," retrieved from http://WWW.dtic.mil/whs/directives/corres/pdf/850002.pdf, Feb. 6, 2003, 102 pp.
Department of Defense, Task Force Report: Resilient Military Systems and the Advanced Cyber Threat, Jan. 2013, 146 pgs.
Dooley et al., "Software-as-a-Service: The iPlant Foundation API," Texas Advanced Computing Center, The University of Texas, Nov. 2012, 8 pp.
Duren, "Organically Assured and Survivable Information Systems (OASIS) Technology Transition Assessment (OTTA)," Defense Advanced Research Projects Agency, DARPA Order No. K128, N684m P004, Mar. 2004, 56 pp.
Ferrie, "Attacks on More Virtual Machine Emulators," Symantec Advanced Threat Research, Sep. 1, 2007, 17 pp.
Figueiredo, et al., "A Case for Grid Computing on Virtual Machines," Proceedings of the 23rd International Conference on Distributed Computing Systems (ICDCS 2003), May 2003, 10 pp.
Garfinkel et al., "A Virtual Machine Introspection Based Architecture for Intrusion Detection," Computer Science Department, Stanford University, Feb. 6, 2003, 16 pp.
Hachman, "Facebook's Web Server Strategy: 'Chinese Foot Soldiers'," PCMag.com, Mar. 15, 2011, 4pp.
Huffmire, et al., "Policy-Driven Memory Protection for Reconfigurable Hardware," ESORICS 2006, LNCS 4189, Sep. 2006, pp. 461-478.
Jiang, et al., "RandSys: Thwarting Code Injection Attacks with System Service Interface Randomization," in Proceedings of the 26th IEEE International Symposium on Reliable Distributed Systems, Oct. 2007, pp. 209-218.
Leech et al., "Socks Protocol Version 5," Network Working Group, RFC 1928, Mar. 1996, 9 pp.
Maftia, "Malicious-and Accidental-Fault Tolerance for Internet Applications," 1st Research Project IST-1999-11583, retrieved at http://spiderman-2.laas.fr/TSF/cabemetlmaftia/index.html, Jan. 1, 2000-Feb. 28, 2003, 2 pp.
Matthews et al., "Data Protection and Rapid Recovery From Attack With A Virtual Private File Server and Virtual Machine Appliances," Clarkson University, 2005, (Applicant points out, in accordance with MPEP 609.04(a), that the year of publication, 2005, is sufficiently earlier than the effective U.S. filing date, 2017, so that the particular month of publication is not in issue.) 12 pp.
Multari et al., "Building the Theory of Resilience", Pacific Northwest National Laboratory, 2013, 39 pgs. Applicant points out, in accordance with MPEP 609.04(a), that the year of publication, 2013, is sufficiently earlier than the effective U.S. filing date, 2017, so that the particular month of publication is not in issue.
Nanda et al., "A Survey on Virtualization Technologies," Stony Brook University, Jan. 2005, 42 pp.
Neugebauer, et al., "Geometrical Cloning of 3D Objects via Simultaneous Registration of Multiple Range Images," IEEE, Mar. 1997, pp. 130-139.
Nguyen, et al., "A framework for diversifying windows native APIs to tolerate code injection attacks," In Proceedings ACM Symposium on Information, Computer and Communications Security (ASIACCS), Mar. 2007, pp. 392-394.
Reiser et al., "VM-FIT: Supporting Intrusion Tolerance with Virtualisation Technology," Proceedings of the 1st Workshop on Recent Advances in Intrusion-Tolerant Systems, 2007, (Applicant points out, in accordance with MPEP 609.04(a), that the year of publication, 2007, is sufficiently earlier than the effective U.S. filing date, 2017, so that the particular month of publication is not in issue.) pp. 18-22.
Reynolds et al., "The Design and Implementation of an Intrusion Tolerant System," IEEE Proceedings of the International Conference on Dependable Systems and Networks (DSN'02), Jun. 2002, 6 pp.
Rowe et al., "Thwarting Cyber-Attack Reconnaissance with Inconsistency and Deception," Proc. 8th IEEE Workshop on Information Assurance, Jun. 2007, 10 pp.
Rowe, "Designing Good Deceptions in Defense of Information Systems," Proc. 2004; retrieved from faculty.nps.edu/ncrowe/acsac04_paper36.htm, ACSAC., Dec. 2004; 16 pp.
Rowe, "Finding Logically Consistent Resource-Deception Plans for Defense in Cyberspace," retrieved from faculty.nps.edu/ncrowe/ssnds07.htm, May 2007; 9 pp.
Rutkowska, "Disposable VMs," The Invisible Things Lab's blog, Kernel, Hypervisor, Virtualization, Trusted Computing and other system-level security stuff, Jun. 1, 2010, 7pp.
Shacham, et al., "On the Effectiveness of Address-Space Randomization," in Proceedings of the ACM Conference on Computer and Communications Security (CCS '04), Oct. 2004, 10 pp.
Shi et al., "An Intrusion-Tolerant and Self-Recoverable Network Service System Using A Security Enhanced Chip Multiprocessor," IEEE Proceedings of the Second International Conference on Autonomic Computing (ICAC'05), Jun. 2005, 11pp.
Tinc VPN, Welcome to tinc!, Feb. 4, 217, Retrieved from https://www.tinc-vpn.org/, 2 pgs.
Verissimo, "MAFTIA—Malicious and Accidental Fault Tolerance for Internet Applications," TF-CSIRT Workshop, Sep. 2005, 14 pp.
Wang et al., "SafeFox: a Safe Lightweight Virtual Browsing Environment," Proceedings of the 43rd Hawaii International Conference on System Sciences-, Jan. 2010, 10 pp.
Wartell, et al., "Binary stirring: self-randomizing instruction addresses of legacy x86 binary code," In Proceedings of the Oct. 16-18, 2012 ACM conference on Computer and communications security (CCS '12). ACM, New York, NY, USA, 157-168, 12 pp.
Wikipedia—TCP/IP stack fingerprinting, Retrieved on Apr. 7, 2017 from https://en.wikipedia.org/wiki/TCP/#stack_fingerprinting, 3 pgs.
Zambreno, et al., "High-Performance Software Protection using Reconfigurable Architectures," Proceedings of the IEEE, vol. 94, Issue 2, Feb. 2006, 13 pp.
U.S. Appl. No. 15/604,850, filed May 25, 2017 by Daniel McArdle et al.
Prosecution history from U.S. Appl. No. 15/604,850, dated May 25, 2017, through Sep. 13, 2019, 83 pp.

* cited by examiner

SELF-HEALING ARCHITECTURE FOR RESILIENT COMPUTING SERVICES

This application is a continuation of U.S. patent application Ser. No. 15/604,850, filed May 25, 2017, the entire content of which is incorporated by reference.

BACKGROUND

Computing systems face increasing cybersecurity threats. Some systems for counteracting cyberattacks require humans to quickly detect, confirm, and respond to cyberattacks. However, systems that rely on human intervention may be ill-equipped to defend against automated cyberattacks. Therefore, systems are needed for responding to cyberattacks without human involvement.

SUMMARY

In one example, this disclosure describes a method comprising: initializing, by a distributed computing system, a plurality of virtual machines (VMs) configured to provide a service, wherein: the distributed computing system hosts a first VM of the plurality of VMs, the distributed computing system hosts a second VM of the plurality of VMs, the first VM is in an active mode and the second VM is not in the active mode, initializing the plurality of VMs comprises, for each respective VM of the plurality of VMs: generating a unique Application Binary Interface (ABI) for an operating system for the respective VM; compiling a software application such that the software application is configured to use the unique ABI for the operating system for the respective VM; and installing the operating system for the respective VM and the compiled software application on the respective VM, wherein, for each respective VM of the plurality of VMs, the ABI for the operating system for the respective VM is different from the ABIs for the operating systems for each other VM of the plurality of VMs; dispatching, by the distributed computing system, to one or more VMs of the plurality of VMs that provide the service and are in the active mode, one or more request messages for the service; determining, by the distributed computing system, in response to software in the first VM invoking a system call in a manner inconsistent with the unique ABI for the operating system of the first VM, that a failover event has occurred; and responsive to determining that the failover event has occurred, failing over, by the distributed computing system, from the first VM to the second VM such that the second VM is in the active mode instead of the first VM.

In another example, this disclosure describes a distributed computing system comprising: a dispatcher node; a plurality of host devices, wherein one or more host devices of the plurality of host devices are configured to: initialize a plurality of virtual machines (VMs) configured to provide a service, wherein: the plurality of VMs includes a first VM and a second VM, the first VM is in an active mode and the second VM is not in the active mode, wherein the one or more host devices of the plurality of host devices are configured such that, as part of initializing the plurality of VMs, the one or more host devices, for each respective VM of the plurality of VMs: generate a unique Application Binary Interface (ABI) for an operating system for the respective VM; compile a software application such that the software application is configured to use the unique ABI for the operating system for the respective VM; and install the operating system for the respective VM and the compiled software application on the respective VM, wherein, for each respective VM of the plurality of VMs, the ABI for the operating system for the respective VM is different from the ABIs for the operating systems for each other VM of the plurality of VMs; wherein the dispatcher node is configured to distribute to one or more VMs of the plurality of VMs that provide the service and are in the active mode, one or more request messages for the service; wherein the distributed computing system is configured to determine, in response to software in the first VM invoking a system call in a manner inconsistent with the unique ABI for the operating system of the first VM, that a failover event has occurred; and wherein, responsive to determining that the failover event has occurred, the distributed computing system fails over from the first VM to the second VM such that the second VM is in the active mode instead of the first VM.

In another example, this disclosure describes a computer-readable data storage medium having instructions stored thereon that, when executed, configure a distributed computing system to: initialize a plurality of virtual machines (VMs) configured to provide a service, wherein: the plurality of VMs includes a first VM and a second VM, the first VM is in an active mode and the second VM is not in the active mode, the instructions configure the distributed computing system such that, as part of initializing the plurality of VMs, the distributed computing system, for each respective VM of the plurality of VMs: generates a unique Application Binary Interface (ABI) for an operating system for the respective VM; compiles a software application such that the software application is configured to use the unique ABI for the operating system for the respective VM; and installs the operating system for the respective VM and the compiled software application on the respective VM, wherein, for each respective VM of the plurality of VMs, the ABI for the operating system for the respective VM is different from the ABIs for the operating systems for each other VM of the plurality of VMs; dispatch, to one or more VMs of the plurality of VMs that provide the service and are in the active mode, one or more request messages for the service; determine, in response to software in the first VM invoking a system call in a manner inconsistent with the unique ABI for the operating system of the first VM, that a failover event has occurred; and responsive to determining that the failover event has occurred, fail over, by the distributed computing system, from the first VM to the second VM such that the second VM is in the active mode instead of the first VM.

The details of one or more examples are set forth in the accompanying drawings and the description below. Other features, objects, and advantages of the disclosure will be apparent from the description, drawings, and from the claims.

DETAILED DESCRIPTION

Figure 1:
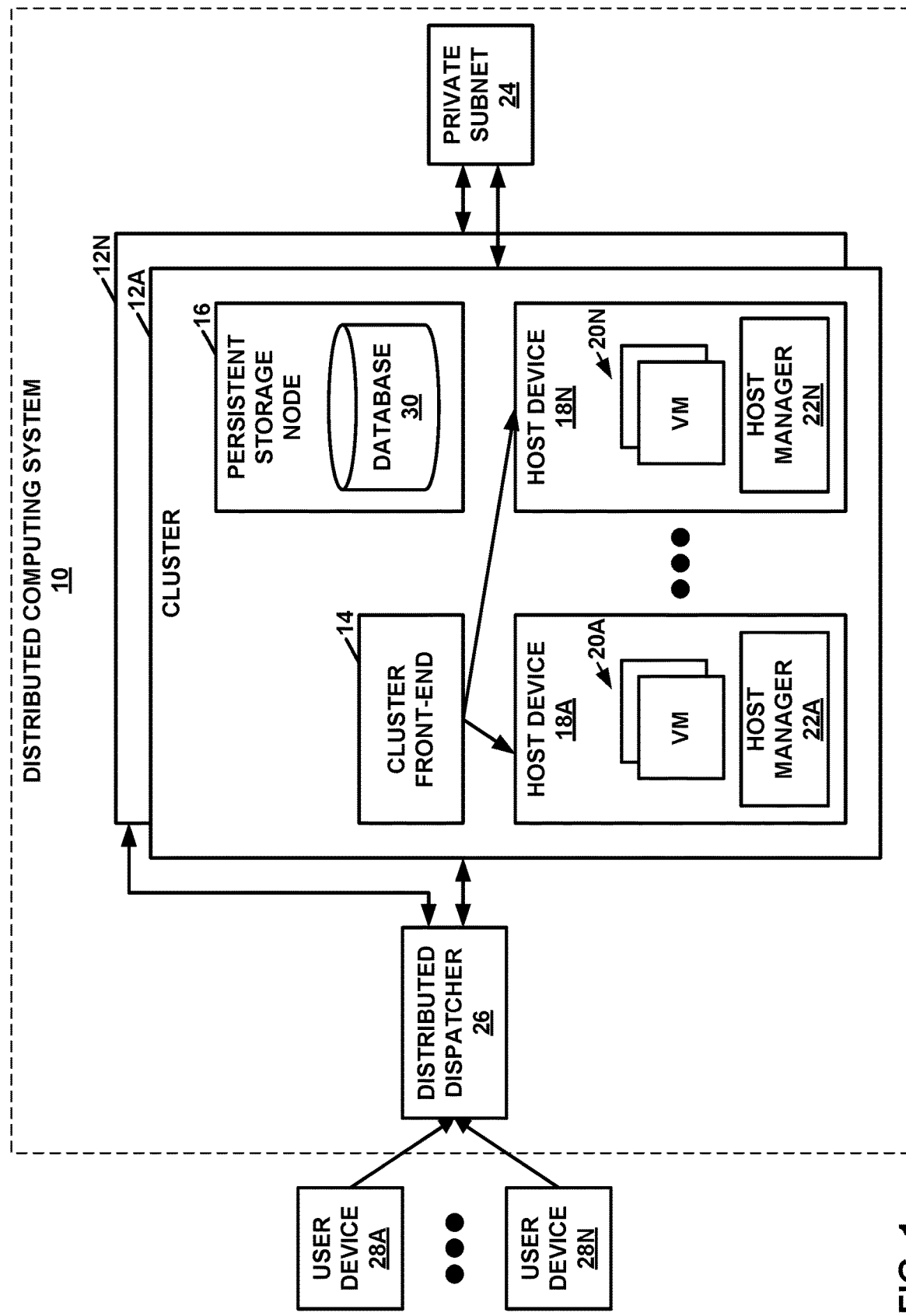
FIG. 1 is a block diagram illustrating an example distributed computing system having a self-healing architecture for resilient computing services, in accordance with one or more aspects of this disclosure.

Modern computing systems may be disrupted in various ways. For example, a cyberattack may compromise one or more nodes of a computing system, preventing the nodes from performing their tasks. In another example, one or more nodes of a computing system may be physically destroyed or cut off from their power supplies. Thus, critical computing services may only be as resilient as their host system, which is typically a single computer or rack of servers.

The current state of the art in host protection fails to provide adequate defense against advanced adversaries. Even against common, "opportunistic" malware, existing host protection approaches provide limited benefits, with a 50% zero-day failure rate and daily new-malware failures. Against advanced malware, the protections are as good as nonexistent. As advanced and targeted cyberattacks are increasingly used to compromise military, government, and commercial organizations, the lack of worthwhile host protection software is becoming a serious and costly problem for cyber defense.

Current approaches to protecting critical computer systems focus on prevention and monitoring (e.g., stopping an adversary from successfully attacking the system and detecting any successful or attempted intrusions). In some instances, when faced with advanced adversaries, neither of these goals may be achievable. Since critical software services should remain operational in the face of advanced adversaries, resiliency is desirable in addition to prevention and monitoring.

Sensitive and mission-critical computer networks may need improvements in host security to withstand the increasingly common advanced adversaries in today's cyber threat landscape. Current defenses against cyberattack place a human in the loop, which limits their ability to quickly detect, confirm, and respond to cyberattacks. Human reaction times are very slow in comparison to the speed of cyberattacks, which can occur within milliseconds. A survivable system must be able to react to attacks more quickly than can be accomplished through manual intervention. Survivable systems may therefore involve an automated response capability, so the network can dynamically respond to threats in real time. Presently, there is an unfavorable asymmetry between advanced adversaries who rapidly launch automated attacks and the response teams composed of humans. To correct this imbalance and keep up with an onslaught of automated cyberattacks, computing systems should have automated response capabilities.

This disclosure describes computing systems having self-healing architectures that provide resilient computing services. Computing systems implementing techniques of this disclosure may provide a high-availability, fault-tolerant infrastructure that may keep systems running through cyber or physical attacks. An insight behind the distributed computing system of this disclosure is that critical computing services are only as resilient as their host system, which is typically a single computer or a rack of servers. As described herein, a computing system implementing a self-healing architecture for resilient computing services may use virtualization and distributed algorithms to decouple computing services from specific hardware systems and from physical locations. When a critical software service is transitioned to run on the distributed computing system of this disclosure, the software service may gain resilience against cyber and physical attacks.

Accordingly, in one example of this disclosure, a distributed computing system may initialize a plurality of virtual machines (VMs) that are each configured to provide a service. In this example, a first host device of the distributed computing system hosts a first VM of the plurality of VMs and a second host device of the distributed computing system hosts a second VM of the plurality of VMs. In this example, the first VM is in an active mode and the second VM is not in the active mode (e.g., the second VM is in a standby mode). In this example, as part initializing the plurality of VMs, for each respective VM of the plurality of VMs, the distributed computing system generates a unique Application Binary Interface (ABI) for an operating system for the respective VM. Additionally, in this example, as part of initializing the respective VM, the distributed computing system compiles a software application such that the software application is configured to use the unique ABI for the operating system for the respective VM. Furthermore, in this example, as part of initializing the respective VM, the distributed computing system may install the operating system for the respective VM and the compiled software application on the respective VM. In this example, for each respective VM of the plurality of VMs, the ABI for the operating system for the respective VM may be different from the ABIs for the operating systems for each other VM of the plurality of VMs.

Furthermore, in this example, a dispatcher node of the distributed computing system may dispatch to one or more VMs of the plurality of VMs that provide the service and are in the active mode, request messages for the service. In this example, the first host device may determine, in response to software in the first VM invoking a system call in a manner inconsistent with the unique ABI for the operating system of the first VM, that a failover event has occurred. In this example, responsive to determining that the failover event has occurred, the distributed computing system fails over from the first VM to the second VM such that the second VM is in the active mode instead of the first VM. In this way, the distributed computing system may automatically detect cyberattacks and quickly failover to another VM such that the ability of the distributed computing system to provide the service is not interrupted. Moreover, in the example above, the first and second VMs may be hosted by physically separated host devices. Hence, disabling one of the host devices does not prevent the distributed computing system from providing the service.

FIG. 1 is a block diagram illustrating an example distributed computing system 10 having a self-healing architecture for resilient computing services, in accordance with one or more aspects of this disclosure. In the example of FIG. 1, distributed computing system 10 comprises a plurality of clusters 12A-12N (collectively, "clusters 12"). Clusters 12 work together as a distributed system to ensure the availability of mission-critical services.

In the example of FIG. 1, cluster 12A includes a cluster front-end 14, a persistent storage node 16, and one or more host devices 18A-18N (collectively, "host devices 18"). Host devices 18A-18N may implement one or more virtual machines (VMs) 20A-20N (collectively, "VMs 20") and host managers 22A-22N (collectively, "host managers 22"), respectively. Additionally, system 10 includes a private subnet 24, a distributed dispatcher 26, and user devices 28A-28N (collectively, "user devices 28"). Each of clusters 12 may include components equivalent to those of cluster 12A. For instance, a cluster front-end, a persistent storage node, and one or more host devices may be present in each of clusters 12. Thus, statements in this disclosure regarding cluster front-end 14, persistent storage node 16, host devices 18, VMs 20, host managers 22, etc. of cluster 12A may be equally applicable to cluster front-ends, persistent storage nodes, host devices, VMs, host managers, etc. of other clusters of distributed computing system 10.

Host devices 18 may be separate physical devices, such as server computers, server blades, personal computers, mobile devices, or other types of computing devices. VMs 20 provide one or more services. For example, a VM of a cluster may provide a web server. In another example, a VM of a cluster may provide a database access service. In another example, a VM of a cluster may provide a secure messaging service. This disclosure may describe a cluster as providing a service if a VM of the cluster provides the service. For instance, if a VM hosted by host device 18A of cluster 12A provides a secure messaging service, this disclosure may describe cluster 12A as providing the secure messaging service. In some examples, each of clusters 12 provides the same set of services. For example, each of clusters 12 may include a host device that hosts a VM that provides a separate instance of a secure messaging service. Since each of clusters 12 may provide the same set of services, this disclosure may describe distributed computing system 10 as providing the set of services provided by clusters 12 of distributed computing system 10.

Cluster front-end 14 may be implemented using one or more nodes, such as physical or virtual machines. In some examples, one or more functions of cluster front-end 14 are performed at host devices 18. Cluster front-end 14 performs management functions for cluster 12A. For example, cluster front-end 14 may provide a firewall service that monitors and controls incoming network traffic for cluster 12A based on predetermined security rules. In some examples, the firewall service of a cluster also monitors and controls outgoing network traffic based on the same or different security rules. The firewall service may be implemented as a hardware-based firewall computer appliance, a software appliance running on general purpose hardware, or another type of firewall. In some examples, cluster front-end 14 distributes network traffic to VMs 20. In some examples, cluster front-end 14 performs some or all of the functions described herein with regard to host managers 22.

In general, each of VMs 20 operates within its own "sandbox." Thus, VMs 20 of cluster 12A are unable to modify the state or data of any other VM of cluster 12A or any other cluster of distributed computing system 10. For instance, VMs 20 may not be able to communicate via private subnet 24. Moreover, because each of VMs 20 operates within its own sandbox, the VM may only be able to effect distributed computing system 10 in limited ways, such as by modifying data in database 30 or by sending messages for transmission to user devices 28.

In some examples, one of clusters 12 of distributed computing system 10 serves as an active cluster, while other clusters of distributed computing system 10 serve as standby clusters. Thus, a protected software service runs inside a set of VMs (e.g., VMs 20) on one cluster while a set of backup VMs waits, paused at a known good state, on another cluster. In this disclosure, a VM in an active cluster is considered to be in an active mode while a VM in a standby cluster is considered to be in a standby mode. In some examples, an individual VM providing a service within a cluster may be in the active mode while another VM providing the service within the same cluster may be in the standby mode.

If a failover event occurs, distributed computing system 10 fails over from a first VM in the active mode to a second VM in the standby mode such that the second VM is in the active mode instead of the first VM. In some examples, the first VM and the second VM are in different clusters. In some examples, the first VM and the second VM are in the same cluster.

Various types of events may be characterized as a failover event. In some examples, failover events may occur at a cluster level. For example, a failover event may occur if an active cluster or a host device in the active cluster is physically disabled. For instance, in this example, the active cluster may be physically disabled if one or more physical devices of the active cluster are physically destroyed or lose power. In some examples, a failover event may occur if the standby clusters of distributed computing system 10 lose communication with one or more devices (e.g., host devices, persistent storage node, etc.) of the active cluster. In some examples, a failover event may occur if a cyberattack is detected in the active cluster. For instance, when an intrusion is detected in a service provided by the active cluster, a backup, standby cluster takes over, providing a near-instantaneous fast failover.

In some examples, failover events may occur at a level beneath the cluster level. For example, a failover event may occur if a host device hosting a VM in the active mode is physically disabled. In some examples, a failover event may occur if one or more physical devices other than a host device hosting a VM in the active mode detect loss of communication with the VM or host device of the VM, or if the host device of the VM detects a loss of communication with the VM. In some examples, a failover event may occur if a cyberattack is detected in a VM that is in the active mode.

Failover may occur in various ways. For instance, in some examples, failover may occur at a cluster level. In such examples, when a failover event occurs with regard to one or more VMs in a first cluster, VMs in a second cluster enter the active mode while all VMs in the first cluster are discarded, enter the standby mode, or enter a mode other than the active mode. In other examples, failover may occur at a VM level. For instance, when a failover event occurs with regard to a first VM in a first cluster, a second VM in the same cluster or different cluster may enter the active mode in place of the first VM.

In various examples, which standby cluster become the active cluster is determined in various ways. For example, each of clusters 12 may be associated with an index value and the standby cluster with the lowest index value may become the active cluster. Moreover, in various examples where failover occurs at a VM level or host device level, which VM in the standby mode enters the active mode may be determined in various ways. For example, VMs may be assigned a numerical index at VM initialization time, and the identifiers may be used for determining which VM is to enter the active mode next. In either example, the numerical indices may be stored in database 30. Since copies of database 30 are synchronized, host devices, cluster front-ends, VMs, etc. may not need to communicate with each other in response to a failover event to determine which VM(s) or clusters are to enter the active mode.

User devices 28 include devices that attempt to access services provided by distributed computing system 10. For instance, user devices 28 include devices that use services provided by distributed computing system 10. In one example, distributed computing system 10 provides a secure messaging service used by user devices 28. From the perspective of distributed computing system 10, user devices 28 are not considered to be secure. For instance, one or more of user devices 28 may be controlled by a party that wants to compromise the security of a service provided by distributed computing system 10 (e.g., to disable the service, exfiltrate sensitive data, etc.).

Each of user devices 28 may comprise one or more computing devices. For example, user devices 28 may include personal computers, mobile computing devices (e.g., laptops, smartphones, tablet computers, etc.), server computing devices, intermediate network devices (e.g., routers, switches, etc.), Internet of Things (IoT) devices, and/or other types of physical devices for processing information. User devices 28 may communicate with distributed dispatcher 26 via one or more communications networks, such as an internet, local area network, or other type of communication network. Furthermore, computing devices of distributed dispatcher 26 may communicate with cluster front-ends of clusters 12 via one or more communications networks or links.

Distributed dispatcher 26 receives messages from user devices 28 and forwards the messages to a cluster front-end of whichever cluster of distributed computing system 10 includes VMs in the active mode. In some examples, distributed dispatcher 26 does not forward messages from user devices 28 to standby clusters of distributed computing system 10. For instance, if cluster 12A is the active cluster, distributed dispatcher 26 forwards messages from user devices 28 to cluster 12A, but not to any of clusters 12B-12N. In other examples, distributed dispatcher 26 may forward messages from user devices 28 to two or more clusters 12 of distributed computing system 10, including the active cluster and one or more standby clusters. For instance, distributed dispatcher 26 may forward messages from user devices 28 to each of clusters 12. In some such examples, cluster front-ends of standby clusters may discard the messages from user devices 28. Forwarding messages to each of clusters 12 may eliminate the need for distributed dispatcher 26 to receive and store data indicating which of clusters 12 is the active cluster of distributed computing system 10, and therefore may reduce latency when a failover event occurs. However, forwarding messages to each of clusters 12 may multiply the quantity of messages.

Distributed dispatcher 26 may comprise one or more dispatcher nodes. Each dispatcher node of distributed dispatcher 26 may be a physical or virtual machine. In some examples, the dispatcher nodes of distributed dispatcher 26 are geographically distributed. Thus, failure of one or more dispatcher nodes of distributed dispatcher 26 does not necessarily disable access to services provided by distributed computing system 10. In other words, in instances were distributed dispatcher 26 comprises multiple dispatcher nodes, distributed dispatcher 26 does not act as a single point of failure for distributed computing system 10. Furthermore, having distributed dispatcher 26 implemented using multiple dispatcher nodes, especially multiple physical nodes, may improve resilience to denial of service attacks because there may be physically more devices to handle the increased load. Additionally, use of multiple geographically distributed dispatcher nodes may reduce latency when a service provided by distributed computing system 10 is used over a wide geographical region.

The presence of distributed dispatcher 26 and the rest of distributed computing system 10 may be transparent to user devices 28. That is, the experience for user devices 28 in accessing a service provided by distributed computing system 10 may be indistinguishable from communicating with a physical machine that provides the service. For example, a service provided by distributed computing system 10 may be associated with a particular Internet Protocol (IP) address. In this example, a network topology is such that all paths from user devices 28 to a node associated with the particular destination address (e.g., IP address) pass through a node of distributed dispatcher 26. Thus, when a dispatcher node of distributed dispatcher 26 receives a message from one of user devices 28, the dispatcher node can forward the message to one or more clusters of distributed computing system 10.

In some examples, distributed dispatcher 26 acts as a load balancer. For instance, in one example, there may be multiple VMs in a cluster that are in the active mode and that are configured to provide a service. In this example, distributed dispatcher 26 may distribute new requests from user devices 28 for the service among such VMs in the cluster. In some examples, there may be multiple VMs in multiple clusters that are in the active mode and that are configured to provide a service. In this example, distributed dispatcher 26 may distribute new requests from user devices 28 for the service among such VMs in the clusters.

Cluster front-end 14 may comprise one or more nodes that mediate between distributed dispatcher 26 and VMs 20 by forwarding network traffic. The nodes of cluster front-end 14 may comprise virtual or physical machines. Cluster front-end 14 may receive messages from distributed dispatcher 26 via one or more network connections. Additionally, cluster front-end 14 may forward messages to VMs 20. In some examples, cluster front-end 14 implements a firewall that filters messages received from distributed dispatcher 26. Cluster front-end 14 may forward messages from VMs 20 to user devices 28 (e.g., via a node of distributed dispatcher 26).

Host managers 22 may initialize VMs 20, start initialized VMs 20, and stop VMs 20. As part of initializing a VM, a host manager may install a guest operating system and one or more application on the VM. For instance, a host manager may install, in a VM, a Linux-based operating system and a particular type of web server application on the Linux-based operating system. In some examples, different VMs 20 in cluster 12A may host different operating systems and/or different applications. In some examples, multiple VMs 20 in cluster 12A host the same operating systems and applications. For example, a plurality of VMs 20 may each host a different instance of the same web server application.

In some examples, a host manager may allow a VM to keep running indefinitely, or until a cyberattack is detected in the VM. In some examples, a host manager may stop and replace VMs on a regular basis, regardless of whether cyberattacks are detected in the VMs. In other words, the host manager may refresh VMs according to a refresh policy. This may prevent malicious code or data from lying dormant in the VMs for extended periods of time. The refresh policy may be user configurable. Thus, a user may be able to set a "churn" level that dictates how frequently VMs are replaced with pristine copies, effectively erasing any damage to the VMs an attacker may have caused.

In some examples, a host manager may stop and replace a VM on a transaction-by-transaction basis. For instance, when a user device initiates a transaction with a service provided by distributed computing system 10, a host manager may assign the transaction to a VM. The assigned VM receives messages from the user device associated with the transaction and sends responses to the user device. After the VM has completed one or more transactions, the host manager stops the VM and replaces the VM with a fresh VM. In other words, the host manager discards or disposes of the VM. Hence, this disclosure may refer to the VMs as "disposable VMs" (D-VMs). The software of the fresh VM is known to be free of malicious code and data. In this way, even if an attacker were to successfully store malicious code or data in a VM as part of a transaction, the malicious code or data may be erased at the end of the transaction. For example, if a transaction installed a rootkit on a VM, the rootkit is discarded with the VM. To prevent delays associated with stopping and replacing VMs, the host manager may have one or more initialized VMs waiting in standby mode that are ready to serve as replacement VMs. If the transaction modified the persistent application state on database 30 in some way, a cluster front-end, host manager, persistent storage node, or other device may discover the incorrect state by application-level checks and may correct the state by rollback. Discrete points in time at which distributed computing system 10 disposes of VMs and creates checkpoints may be determined by discrete units of interaction with remote clients that may be called "transactions." For example, persistent storage node 16 may generate a checkpoint in response to initiation or termination of a Transmission Control Protocol (TCP) session. An example system for replacing VM is described in U.S. Publication 2015/0309831, "Fight-Through Nodes with Disposable Virtual Machines and Rollback of Persistent State," filed Jul. 2, 2015, the entire content of which is incorporated by reference.

In some examples, a transaction may correspond to a session of a communication protocol, such as TCP. However, some communication protocols do not include the notion of a session. In other words, such communication protocols are sessionless communication protocols. For example, the User Datagram Protocol (UDP) is a sessionless communication protocol. To accommodate sessionless communication protocols, host managers 22 may determine the start and completion of a transaction based on factors other than the start and completion of a session. For example, host managers 22 may determine the start of a transaction upon receiving one or more packets from a distinct source (e.g., a distinct IP address). In this example, host managers 22 may determine the completion of transactions when a terminating event occurs. In some examples, the terminating event is a determination that a particular amount of time has passed following a most recent time that a host device has received data from the source. Furthermore, in some examples, transactions can be defined as application level sessions.

Thus, in some examples, a transaction comprises a stream of data from a source. An initiation condition of the transaction may comprise receiving the stream of data from the source. In some instances, the stream of data from the source comprises a stream of UDP data. Furthermore, in some such examples, an automatic trigger for discarding a VM is an elapsing of a particular amount of time following receiving a last unit of data from the source. In other examples, the automatic trigger is an indication of a termination of an application level session.

When a host device discards a VM, the host device may return the resources of the VM to a pool of available resources and all state information of the VM may be lost. For example, each of VMs 20 may include Random Access Memory (RAM) and a file system on a virtual "hard disk." In this example, a VM may use the file system on the VM's virtual "hard disk" to store application files, a database, and/or other types of data. In this example, data stored in the VM's RAM and virtual "hard disk" may be deleted, overwritten (e.g., with random data or "zero'ed out"), and/or become functionally inaccessible when the VM is discarded.

Because VMs 20 are discarded according to a refresh policy, any malware installed on VMs 20 while processing transactions may be discarded along with VMs 20. For example, malware may be installed in one of VMs 20 while the VM is processing a transaction. That is, many types of cyberattacks attempt to make permanent malicious changes to a machine (e.g., installation of a rootkit or malicious modification of a Windows registry). In this example, the malware is discarded with the VM is discarded. As a result, the malware may not be present when a VM of one of host devices 18 processes another transaction. Consequently, the immediate harm from the transaction may be relatively small or non-existent. In this way, distributed computing system 10 may implement a security model based on discarding attacked VMs rather than preventing cyberattacks.

Persistent storage node 16 provides persistent storage of data. For instance, persistent storage node 16 may host a copy of a database 30 that is read and/or write accessible by one or more of VMs 20 of cluster 12A. In general, database 30 may be an organized collection of data. In some examples, database 30 may be read and/or write accessible by software, firmware, and/or hardware other than or in addition to VMs 20 of cluster 12A. The copy of database 30 of cluster 12A may be persisted independently of VMs 20 of cluster 12A. Thus, the copy of database 30 of cluster 12A may continue to exist and be accessible regardless of whether any VMs 20 of cluster 12A exist. For instance, the copy of database 30 may exist and may be accessible before any of VMs 20 are instantiated and after all of VMs 20 are discarded.

Database 30 may store various types of data. For example, database 30 may store website data, application state data, session state data, VM state data, documents, navigation data, scientific data, business data, military data, governmental data, file system data, or various other types of data, including data generated and used by services provided by VMs 20. Database 30 may be implemented in various ways. For example, database 30 may comprise a relational database. In some examples, database 30 comprises a file system that supports geo-replication between multiple locations. For instance, the file system may be an open-source GlusterFS distributed file system. In this way, persistent storage node 16 may provide VMs 20 with access to a distributed file system, as well as access to common databases. In a third example, database 30 comprises a block-level storage abstraction. Other applicable types of databases may include PostgreSQL, NoSQL databases such as Apache CouchDB, NewSQL databases, object-oriented databases, RDF databases, XML databases, and so on.

Furthermore, as part of processing transactions initiated by user devices 28, VMs 20 may generate database modification requests. The database modification requests may be requests to modify data in database 30. In this disclosure, a database modification request may be "associated with" a transaction when a VM generates the database modification request as part of processing the transaction. VMs 20 may generate database modification requests to modify data in database 30 because data written to RAM, virtual "hard disks," or other real or virtual data storage media associated with VMs 20 may be deleted (and/or become functionally inaccessible) when VMs 20 are discarded. For instance, the use of disposable VMs may assume a component to hold persistent (shared) state, such as database 30. Thus, the example design of FIG. 1 may be suitable for many server applications that maintain persistent state on a backend server.

Persistent storage node 16 may receive database modification requests from VMs 20. Furthermore, persistent storage node 16 may perform modifications to database 30 in response to the database modification requests. For example, persistent storage node 16 may receive a database modification request associated with a particular transaction. In this example, persistent storage node 16 may perform a modification to database 30 in response to the database modification request associated with the respective transaction request.

In some examples, persistent storage node 16 may implement an Application Programming Interface (API). In some such examples, VMs 20 may generate database modification requests when VMs 20 invoke particular methods of the API. Likewise, persistent storage node 16 may receive a database modification request when persistent storage node 16 receives an invocation of a method of the API. In some examples, a persistent file system stored at database 30 may be configured to only interact with specific ones of VMs 20, and only interact in specific ways using the limited API. For instance, a Network File System (NFS) protocol may be used as an interface between VMs 20 and the persistent shared file system.

The use of database 30 (e.g., a shared file system) may provide for continuity of application state between transactions. For example, as part of processing a first transaction, a first VM may generate a database modification request to write a particular piece of data to database 30. In this example, as part of processing a second transaction, a second VM may generate a database read request to read the particular piece of data from database 30. In another example, distributed computing system 10 may host a content management system. In this example, VMs 20 may need to save files or update a database (e.g., the content management system), and if these changes were made locally inside the ephemeral VMs 20, the changes would be deleted when VMs 20 are discarded.

Some applications maintain state between transactions (e.g., either in application memory, on disk, etc.). For example, a web server may have a persistent session with a client (e.g., one of user devices 28). A host manager may transfer such internal application state between VM instances via database 30. In some examples, application state is flushed to the shared file system before a VM is destroyed, and read back in by applications when new VMs are instantiated. Thus, the VM may generate a database modification request as part of completing a transaction. The database modification request may request storage to database 30 of an application running on the VM.

In accordance with one or more examples of this disclosure, persistent storage node 16 may implement checkpointing and rollback for database 30. Checkpointing is used to record a state history of database 30 (e.g., a persistent shared file system). The use of checkpointing may allow database 30 to roll back if a compromise is detected on database 30. Database 30 may be checkpointed at some interval (e.g., after each client transaction or some multiple number of client transactions) to preserve a fine-grained history of the state of database 30. In some examples, checkpointing may rely on a file system such as ZFS to create differential snapshots of the file system state. In such examples, the ZFS file system may be used because the ZFS file system natively supports checkpointing and rollback.

Thus, in some examples, distributed computing system 10 comprises a first cluster and a second cluster (e.g., cluster 12A, cluster 12N). In this example, the first cluster includes a first host device (e.g., host device 18A) and a first persistent storage node (e.g., persistent storage node 16). The second cluster includes the second host device and a second persistent storage node. Furthermore, the first persistent storage node stores a first copy of a database (e.g., database 30). The first persistent storage node may persist the first copy of the database independently of the first VM. In this example, the second persistent storage node stores a second copy of the database. The second persistent storage node may persist the second copy of the database independently of the second VM. In this example, the first VM may receive a request message for the service. As part of processing the request message, the first VM may generate a database modification request. Responsive to the database modification request, the first persistent storage node may perform a modification to the first copy of the database. The first and second persistent storage nodes may synchronize the first copy and the second copy of the database. In this example, as part of synchronizing the first copy and the second copy of the database, the first and second persistent storage nodes may communicate the modification to the first copy of the database to the second persistent storage node via a private subnet (e.g., private subnet 24), which may be implemented as a distributed VPN. Responsive to determining a failover event has occurred, the first and/or second persistent storage nodes may roll back the modification to the database requested by the first VM.

Persistent storage node 16 of cluster 12A may communicate via private subnet 24 with persistent storage nodes of other clusters of distributed computing system 10 to synchronize their individual copies of database 30. Thus, the copies of database 30 hosted by the persistent storage nodes of each of clusters 12 may be same. State information of VMs 20 may also be communicated over private subnet 24.

Private subnet 24 may be implemented in various ways. For example, private subnet 24 may be implemented as a local area network with wired and/or wireless connections. For instance, private subnet 24 may be implemented using Ethernet technology. In some instances where clusters 12 are located near each other, private subnet 24 may be implemented with a dedicated network switch. In some examples, to take advantage of a facility's existing network infrastructure, private subnet 24 may be implemented using one or more virtual local area networks. In some examples, private subnet 24 is implemented using a virtual private network (VPN) over a wide-area network, such as the Internet. For instance, private subnet 24 may be implemented as a distributed VPN, such as Tinc, to provide, private, encrypted communication without a central point of failure.

Host devices 18 and VMs 20 are configured with cyber-attack detection mechanisms that alert host managers 22 to potential cyberattacks. For instance, a host manager may initialize VMs and deploy the VMs for use when ready. As part of initializing a VM, the host manager may inject so-called "tripwires" into the software used in the VM. In normal operation, the software in the VM does not hit any of the tripwires injected into the software used in the VM. However, the host manager is alerted when a VM performs an action that hits a tripwire. In this way, the host manager may be alerted that a cyberattack is potentially occurring in the VM.

Tripwires may be implemented in various ways. For example, software applications frequently invoke system calls. The system calls form part of an Application Binary Interface (ABI) of an operating system. A system call is an invocation of a method performed by a kernel of an operating system. For example, a software application may invoke a system call to write data to an output stream associated with a communication socket. At a machine code level, a software application may perform a system call by storing a call number corresponding to the system call in a first register and storing other parameters of the system call in other registers. The kernel interprets the system call based on the call number stored in the register. To enable software applications to invoke system calls, a mapping of call numbers to corresponding system calls and a mapping of parameters to registers are typically made public. However, as described in detail elsewhere in this disclosure, a tripwire may be injected by modifying (e.g., for each VM) prior to deployment of the VM, the mapping of call numbers to corresponding system calls and/or the mapping of parameters to registers.

Thus, in some examples, as part of initializing a VM, a host manager generates a unique ABI for an operating system for the respective VM. The unique ABI is not made public. Additionally, the host manager may compile a software application such that the software application is configured to use the unique ABI for the operating system for the respective VM. In this example, the host manager may install the operating system for the respective VM and the compiled software application on the respective VM. For each respective VM of a plurality of VMs, such as VMs 20, the ABI for the operating system for the respective VM is different from the ABIs for the operating systems for each other VM of the plurality of VMs. Thus, even if an attacker were to acquire knowledge of the unique ABI of one VM, such knowledge does not carry over to other VMs. Moreover, since VMs of distributed computing system 10 are routinely discarded and replaced, the knowledge does not remain accurate for long.

After a VM is deployed, if the VM detects a system call in a manner inconsistent with the unique ABI of the operating system of the VM, a host manager may determine that a failover event has occurred. For example, if the VM detects a system call that uses the published call numbers or the published parameter/register relationships, the source of the system call must be from software installed after deployment of the VM. Hence, malicious software may have been installed on the VM. Accordingly, the VM may alert the host manager that a cyberattack has occurred. Implementation details regarding the cyberattack detection mechanisms are provided elsewhere in this disclosure.

When a host manager receives an alert that a cyberattack has occurred, the host manager may determine that a failover event has occurred. In some examples, in response to the host manager determining that a failover event has occurred, the host manager may send a message, via private subnet 24, indicating the occurrence of the failover event. In some examples, in response to the host manager determining that the failover event has occurred, the host manager may stop the active cluster from communicating on private subnet 24, allowing the standby clusters to determine independently that a failover event has occurred. Since database 30 is replicated in each of clusters 12 and each of clusters 12 has VMs providing the same services, the new active cluster may be able to seamlessly start providing the services of distributed computing system 10.

As described in detail elsewhere in this disclosure, when a cyberattack detection mechanism determines that a cyberattack has occurred at a particular VM of cluster 12A, persistent storage node 16 may roll back changes to database 30 caused by the particular VM. Additionally, cluster front-end 14, persistent storage node 16, or another component of cluster 12A may send instructions, via private subnet 24, to roll back the changes caused by the particular VM to copies of database 30 in the other clusters of distributed computing system 10. In this way, data written to database 30 by a potentially compromised VM does not persist in database 30, where the data may cause future problems.

In response to determining that a cyberattack has occurred, host managers 22 may instruct persistent storage node 16 to roll back changes to database 30 caused by an attacked VM. In some examples, when persistent storage node 16 receives a database modification request from one of VMs 20, persistent storage node 16 may apply changes indicated by the database modification request to database 30. Furthermore, when persistent storage node 16 receives a database modification request from one of VMs 20, database management system 16 may generate checkpoint data. Database management system 16 may use the checkpoint data to roll back changes to database 30.

In some examples, a rollback may be automatically triggered when an unauthorized change to database 30 (e.g., a file system) is detected (e.g., using a file system IDS, an application-level IDS, an OS-level IDS, or by manual inspection). In some examples, the rollback may be triggered manually. In one example, database 30 may comprise a file system and persistent storage node 16 may check the file system state for correctness. In this example, if the state is incorrect (e.g., because of a transaction associated with a cyber-attack), the state can be rolled back to a previous correct snapshot. In other words, the persistent shared file system can also be restored to an earlier checkpoint. In examples that use checkpointing and a persistent shared state file system, a transaction may be a unit of computation used to form discrete points for disposing of VMs and/or checkpointing a persistent shared state file system.

Figure 2:
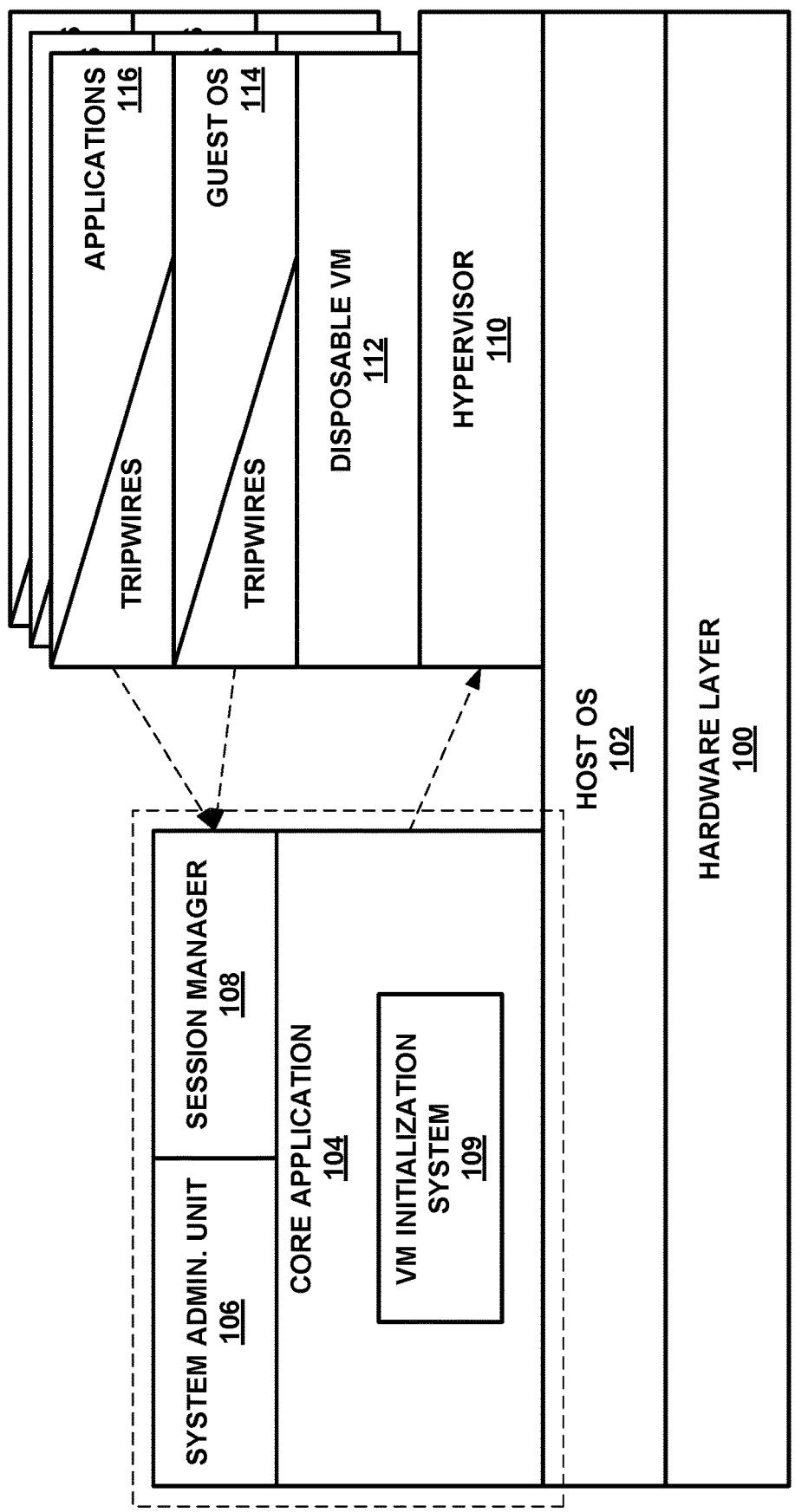
FIG. 2 is a block diagram illustrating an example software stack for a host device of a cluster, in accordance with one or more aspects of this disclosure.

FIG. 2 is a block diagram illustrating an example software stack for a host device of a cluster, in accordance with one or more aspects of this disclosure. In the example of FIG. 2, the lowest level of the stack is a hardware layer 100. Hardware layer 100 represents the physical hardware (e.g., processors, memory, I/O components, etc.) of the host device. A host operating system (OS) 102 runs on top of hardware layer 100. In various examples, host OS 102 may be various types of operating systems, such as a Linux OS, a Microsoft Windows™ OS, and so on.

A core application 104 may run on top of host OS 102. A system administration unit 106 and a session manager 108 may run on top of core application 104. As indicated by the dashed box, core application 104, system administration unit 106, and session manager 108 may together correspond to a host manager of FIG. 1. Furthermore, in the example of FIG. 2, core application 104 comprises a VM initialization system 109.

Additionally, a hypervisor 110 runs on top of host OS 102. Hypervisor 110 creates and runs one or more disposable VMs. For instance, a disposable VM 112 and one or more other disposable VMs are shown in the example of FIG. 2.

The disposal VMs of FIG. 2 may correspond to VMs 20 of FIG. 1. Core application 104 manages the disposable VMs by communicating with hypervisor 110. For instance, core application 104 may initialize VMs and may instruct hypervisor 110 to start or stop the VMs. Particularly, in the example of FIG. 2, VM initialization system 109 initializes VMs.

For each of the disposable VMs of FIG. 2, a guest OS runs on top of the disposable VM. For instance, a guest OS 114 runs on top of disposable VM 112. Additionally, one or more applications may run on top of the guest operating systems. For instance, one or more applications 116 run on top of guest OS 114. The applications may provide services. For example, one or more of applications may provide a secure messaging service, a web server, a robotic system control service, or another type of service.

In the example of FIG. 2, VM initialization system 109 configures the guest OS and applications of each of the disposable VMs with tripwires that detect the execution of any unauthorized, and therefore potentially malicious, machine code. For instance, the guest OS and applications installed on a VM may be modified to use an Application Binary Interface (ABI) unique to the VM. As described in greater detail elsewhere in this disclosure, the ABI is a set of rules defining how information is passed between program components, e.g. which CPU registers are used to hold parameter registers for functions. The low-level transformations performed on the guest OS and applications may give each VM a characteristic style of acceptable code. The tripwires detect violations of the style, which are strong indications that someone is tampering with the system and executing their own machine code. A side effect of the low-level transformations is that each disposable VM is mutually binary-incompatible: they cannot run each other's code, nor can they run binaries compiled for standard systems.

System administration unit 106 may provide a user interface for users to control core application 104. For instance, system administration unit 106 may provide a command line interface that receives commands from a user to start or stop particular VMs. In some examples, system administration unit 106 may execute command scripts provided by users to control core application 104. System administration unit 106 may invoke functions of core application 104 to control core application 104. The functions of core application 104 invoked by system administration unit 106 may be the same as those invoked by session manager 108. In some examples, system administration unit 106 implements a web-based interface for system administrators to create, configure, replace, and destroy VMs. In this way, system administration unit 106 may enable administrators to take control of the distributed computing system 10 when desired.

In some examples, a system administration unit is implemented on a host device in each cluster 12 of distributed computing system 10 (FIG. 1). Thus, there may be a plurality of system administration units in distributed computing system 10. Furthermore, in some examples, one of the system administration units is in an active mode while the other system administration units are in a standby mode. Distributed dispatcher 26 may direct requests to use the system administration unit to the system administration unit in the active mode. Should the system administration unit in the active mode become non-responsive (e.g., due to a host device of the system administration unit being disabled), one of the system administration units in the standby mode may enter the active mode. The active system administration unit may invoke methods of core application 104 to communicate, via private subnet 24, instructions to other host devices in distributed computing system 10. In this way, a user may be able to configure distributed computing system 10 from a single system administration unit, while maintaining the resiliency of distributed computing system 10. In other examples, users use systems administration units on separate host devices separately to configure distributed computing system 10.

Session manager 108 may perform automated routines to determine whether to initialize, start, and stop VMs. Session manager 108 may invoke functions of core application 104 to instruct core application 104 to start or stop particular VMs. For example, session manager 108 may receive state data. Session manager 108 may receive the state data from VMs running on the same host device as session manager 108, from host managers of other nodes in the same cluster or different clusters, or from other sources. The state data may provide information about the state of VMs. For instance, the state data may include load data, memory utilization data, processor utilization data, data related to initiation and completion of transactions, and so on. Based on the state data, session manager 108 may determine whether to initialize, start or stop VMs. For example, if the state data indicates a VM providing a service is overloaded, session manager 108 may instruct core application 104 to start a new VM configured to provide the service. Similarly, in some examples, if the state data indicates a VM providing a service is underutilized, session manager 108 may instruct core application 104 to stop a VM. In some examples, if the state data indicates that a VM has completed a particular number of transactions (e.g., 1 or more), session manager 108 may instruct core application 104 to stop the VM. Furthermore, session manager 108 may receive alerts from tripwires. In response to receiving an alert from a tripwire of a VM, session manager 108 may determine that a failover event has occurred and may instruct core application 104 to stop the VM.

In some examples, session manager 108 supports third-party Intrusion Detection Systems (IDSs). The IDS may comprise a software application or specialized hardware that monitors the VMs for malicious activity or policy violations. Session manager 108 may determine that a failover event has occurred in response to the IDS reporting malicious activity or a policy violation.

In some examples, session manager 108 may instruct core application 104 to refresh VMs, such as VM 112, according to a refresh policy. In this way, distributed computing system 10 may automatically discard and replace VMs according to a refresh policy. For instance, session manager 108 may instruct core application 104 to stop a VM and replace the VM with a fresh VM after the VM has been present for a given amount of time. In another example, session manager 108 may instruct core application 104 to stop a VM and replace the VM with a fresh VM after the VM has processed a particular number of transactions. In some examples, each of the transactions comprises an application level session involving the VM and a user device. The fresh VM may be created from a template known to be free of malware. In this way, a part of automatically discarding and replacing the VMs according to the refresh policy, distributed computing system 10 may automatically discard and replace a VM of the plurality of VMs after the VM has completed processing a particular number of transactions.

By refreshing VMs according to a refresh policy, even if a cyberattack manages to embed malicious code into the guest operating system or applications of a VM, the malicious code does not persist in distributed computing system 10 for long periods of time, even if the cyberattack managed to evade the tripwires. This may avert the potential for maliciously injected code from lying dormant in an operating system or application of a node providing a service until an opportune time to strike.

In some examples, core application 104 receives from user devices 28. If a message corresponds to the start of a transaction, core application 104 may assign the transaction to a VM running on the host device. Additionally, core application 104 may forward the message to hypervisor 110 to forward the message to the assigned VM. In response to subsequent messages associated with the transaction, core application 104 may forward the subsequent messages to hypervisor 110 and instruct hypervisor 110 to forward the subsequent messages to the assigned VM.

In some examples, VM initialization system 109 of core application 104 initializes a VM in response to receiving a message corresponding to the start of a transaction. In such examples, after initializing the VM, core application 104 may assign the transaction to the newly initialized VM. Thus, initializing a VM may be part of assigning a transaction to the VM. In some examples, VM initialization system 109 of core application 104 initializes a VM in response to a request to initiate a TCP session. Thus, in such examples, each new TCP session may cause VM initialization system 109 to initialize a new VM.

In some examples, VM initialization system 109 initializes a pool of VMs. The pool of VMs may include a plurality of VMs. In such examples, when core application 104 receives a request to initiate a transaction and assigns the transaction to a VM, core application 104 may select the VM from among the pool of VMs. Thus, core application 104 may assign the transaction to a VM that was initialized prior to core application 104 receiving the request to initiate the transaction. In this way, core application 104 may initialize a new VM for each incoming transaction, either on demand or pre-fetched.

In some examples, core application 104 receives, from one of user devices 28, a message that implicitly or explicitly includes a request to initiate a transaction. The transaction may be a discrete unit of interaction between server computing system 12 and the client computing device. In one example, the transaction may be a Transmission Control Protocol (TCP) connection (i.e., a TCP session). In this example, core application 104 may receive a TCP SYN message from the client computing device. The TCP SYN message may include a request to initiate a TCP connection. In other examples, the transaction may be a SQL session or another type of session. In examples where a transaction is a session, core application 104 may receive multiple messages associated with the session. In other examples, the transaction may comprise a single message, such as a Hypertext Transfer Protocol (HTTP) request. In another example, a transaction may be an application-level message from one of user devices 28 followed by a corresponding return message from one of the VMs. Because many network protocols are designed with a transactional model, the approach of this example may be applicable to a wide variety of services.

In examples where transactions are TCP sessions, the techniques of this disclosure may be applicable to any application based on TCP. Furthermore, in such examples, it may not be necessary to customize core application 104 for each application by specifying how applications define transactions. Examples where transactions are TCP sessions may require less overhead to process complex client-server interactions than examples where transactions are application-level messages, and may therefore be performed faster and more securely. In some instances, front-end systems (e.g., firewall, handler, dispatcher) that operate on a TCP session level may be less complex (and hence have a smaller attack surface) than front-end systems that operate at an application level.

In some examples, core application 104 does not assign a transaction to one of the VMs if core application 104 has previously assigned a transaction to the VM. Thus, when core application 104 assigns a transaction to one of the VMs, the VM may be in a "fresh" state. In other words, a fresh VM is used for each transaction. It may be possible for core application 104 to assign each transaction to a different fresh VM by handling transactions in VMs. In general, a disposable VM may be a VM intended to be used briefly and discarded. Each of the VMs may be a disposable VM.

In some examples, because none of the VMs has previously processed a transaction, there may be no opportunity for a previous transaction to install malicious code or malicious data on the VMs, or otherwise reconfigure the VMs. Thus, using disposable VMs to interact with other computers may prevent stealth malware from persistently infecting distributed computing system 10 or other computing systems by embedding itself in sensitive data storage areas, such as operating system files of the VMs, in RAM, a cache, registers, or a Basic Input/Output System (BIOS).

Techniques of this disclosure may combine ephemeral VM technology with system-wide Application Binary Interface (ABI) changes, source code and configuration changes, and application-level randomization, giving each VM instance a unique set of operating characteristics. For instance, as part of initializing a VM, VM initialization system 109 may generate a unique ABI for an operating system of the VM. By evolving the ABIs or other characteristics of VMs over time, the techniques of this disclosure may help ensure that any information an adversary or attacker does obtain is incorrect by the time it is used, while minimizing any potential operational or performance impact. These computing systems may present attackers with different, mutually incompatible system instances each time they connect. As one non-limiting example, an adversary that is able to fingerprint a system, such as by using network stack probes, may gain no information that aids in subverting it. In fact, later intrusion attempts using this information can be used to track and correlate adversaries.

These techniques can benefit various different types of computing systems, including network servers and desktop workstations. The techniques may provide both false and actual randomness to running operating systems and applications on a number of levels. These techniques may go beyond currently deployed diversity techniques such as Address Space Layout Randomization (ASLR) by introducing aspects of interface diversity and implementation diversity, both within an application and at the system level, and may modifying the software build system to create unique, yet internally consistent copies of application software and associated libraries. In addition, in some cases, unauthorized code may immediately fault and be killed by the operating system with potentially high probability.

Figure 3:
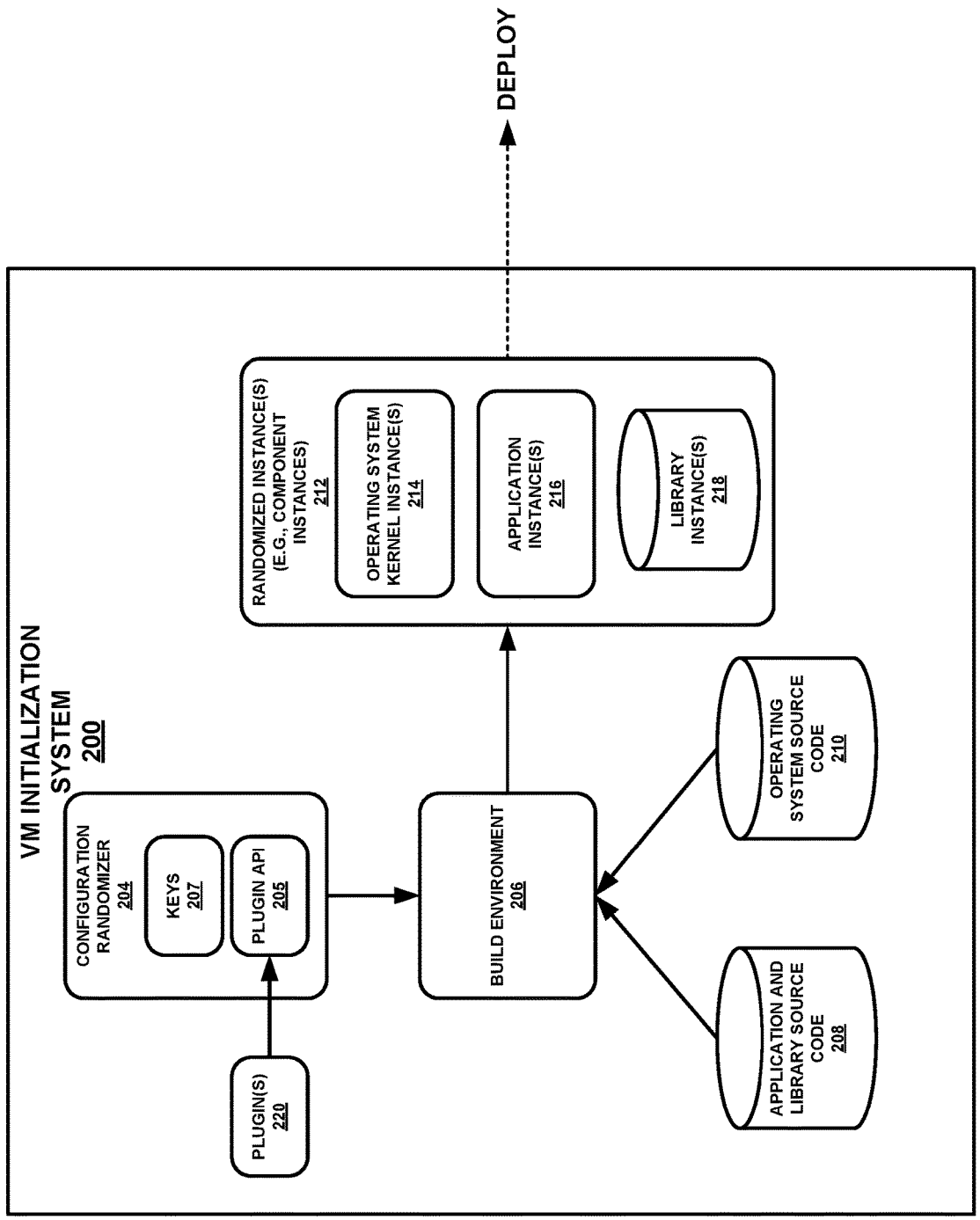
FIG. 3 is a block diagram illustrating an example virtual machine (VM) initialization system that is configured to initialize and deploy randomized operating system kernel, application, and/or library instances for VMs, in accordance with one or more aspects of the present disclosure.

FIG. 3 is a block diagram illustrating an example VM initialization system 200 that is configured to initialize and deploy randomized operating system kernel, application, and/or library instances, for VMs, in accordance with one or more aspects of the present disclosure. VM initialization system 200 may be an example of VM initialization system 109 (FIG. 2), or form part of one of host managers 22 (FIG.

1), or another software unit in distributed computing system 10 (FIG. 1). As shown in the example of FIG. 3, VM initialization system 200 includes a configuration randomizer 204, a build environment 206, application and library source code 208, and operating system source code 210. Configuration randomizer 204 includes a plugin application programming interface (API) 205 for use with one or more plugins 220. As will be described in further detail below, build environment 206 of VM initialization system 200 may utilize configuration randomizer 204, application and library source code 208, and operating system source code 210 to generate one or more randomized instances 212, which may be deployed (i.e., installed) in a VM by a hypervisor, such as hypervisor 110 (FIG. 2). Randomized instances 212 may comprise one or more instances of software components, such as, for example, one or more instances of applications and/or operating systems/kernels. For example, randomized instances 212 may include one or more operating system kernel instances 214, one or more application instances 216, and one or more library instances 218.

Each instance of randomized instances 212 may comprise a unique instance of a particular software component. For instance, one or more of instances 214 may each comprise a unique instance of a particular operating system kernel, where these one or more of instances 214 are different instances of the same software component (e.g., different instances of a given operating system kernel) and are configured to have uniquely different operating characteristics during execution on a virtual machine. Similarly, one or more of instances 216 may each comprise a unique instance of a particular application, and one or more of instances 218 may each comprise a unique instance of a particular library.

To thwart reconnaissance, the techniques of the present disclosure provide randomized instances 212 containing actual operational differences that prevent an adversary's knowledge from being useful or that reveal the adversary's intrusion. Users of VM initialization system 200, such as system deployment personnel, session managers (e.g., session manager 108 (FIG. 2)), etc., may utilize configuration randomizer 204, which generates one or more unique keys 207 that are used by build environment 206 to generate randomized instances 212. Each of keys 207 may comprise random sequences or unique binary data to characterize one or more system properties. As such, each key of keys 207 may comprise randomized configuration information. Build environment 206 may use keys 207 and/or other unique data to customize application and library source code 208 and operating system source code 210, including altering configurations and the kernel and application binary interfaces (ABIs), as described in more detail below.

Build environment may use one or more compilers to compile the customized source code. In some examples, the one or more compilers comprise customized versions of standard compilers, such as a GNU Compiler Collection (GCC) and/or Low Level Virtual Machine (LLVM) compiler. The compilers and/or linkers of build environment 206, along with associated build scripts, may generate randomized instances 212, which include operating system kernel instances 214, application instances 216, and library instances 218. If source code is not available, the techniques of the present disclosure can utilize tools to generate LLVM Intermediate Representation (IR) from binary executables and libraries, and then transform the IR directly and re-assemble it back to executable form. In either case, application operation may be undisturbed, and, to an end user, a modified application, such as one of application instances 216, behaves exactly as an unmodified one would. The overall impact on performance may be minimal in many cases, because the scrambling techniques described herein may not require additional computation at runtime.

The custom operating system, application build, and configuration provided by randomized instances 212 are internally consistent within VM initialization system 200, but may not be binary compatible with standard builds that may be generated by build environment 206 without the use of configuration randomizer 204. Users of VM initialization system 200, such as system deployment personnel, can make as many unique, and mutually binary-incompatible, system builds for randomized instances 212 as desired and/or required. Each instance of randomized instances 212 may comprise a unique instance that is generated based upon one of keys 207, where each of keys 207 may comprise a unique identifier. Further, if a user of VM initialization system 200 wishes to re-build application instances within application instances 216 (e.g., for an already-built system), VM initialization system 200 can re-use the key and configuration data used by configuration randomizer 204 and build environment 206. However, if the deployed instances will not be modified, configuration randomizer 204 and build environment 206 can randomly generate and use a unique, single-use key of keys 207.

Configuration randomizer 204 may utilize certain configuration data or settings, such as provided by one or more plugins 220, which is provided to build environment 206 along with one or more of keys 207. In some examples, the key and configuration data is stored only on VM initialization system 200, and in various examples, is not deployed to or stored on any of the runtime computing systems. In general, plugins 220 may provide configuration settings that are used by configuration randomizer 204 via plugin API 205. In various cases, configuration randomizer 204 may provide one or more of keys 207 based upon the configuration settings provided by plugins 220 via plugin API 205. In some cases, false information that is output by one or more of instances 212 during runtime may be based on these configuration settings.

Configuration randomizer 204 and/or build environment 206 may use various techniques that result in the generation of randomized instances 212. For example, randomized instances 212 generated by build environment 206 and deployed on a runtime computing system may alter server or application configurations. Instances 212 can change configuration settings in internally consistent ways, such as, for example, altering the Unix-domain socket path used by a PHP Hypertext Preprocessor web application to communicate with a local database at runtime. In other non-limiting examples, instances 212 can enable or disable unused features that are not needed, alter "greeting" messages that servers issue, or change TCP/IP parameters slightly.

In various examples, VM initialization system 200 provides first randomized configuration information (e.g., a first key of keys 207), and generates, based on the first randomized configuration information, a first unique instance of a software component (e.g., a first one of operating system kernel instances 214, a first one of application instances 216) that is executable on a runtime computing system. VM initialization system 200 may also provide second randomized configuration information (e.g., a second key of keys 207), the second randomized configuration information being different from the first randomized configuration information, and may generate, based on the second randomized configuration information, a second unique instance of the software component (e.g., a second one of operating system kernel instances 214, a second one of application instances 216) that is executable on the runtime computing system. The first and second unique instances of the software component are different instances of the same software component that each are configured to have uniquely different operating characteristics during execution on the runtime computing system. The first and second unique instances of the software component are each further configured, during execution on the runtime computing system, to output false information to an external computing system, as will be described in further detail below.

The use of the techniques described herein may provide a high degree of uniqueness among deployed instances 212, while at the same time thwarting dynamic analysis, static analysis, and other forms of reverse engineering. Source code compatibility may also be maintained, given that modifications to application and library source code 208, as well as operating system source code 210, may not be required. Instead, configuration randomizer 204 and build environment 206 may utilize existing application and library source code 208 and operating system source code 210 to generate randomized instances 212. Where source code is not available, many of these techniques can be implemented using binary transformations on LLVM IR. The techniques may make crashing a natural consequence of an attacker's initial operations (e.g., buffer overflows, library calls, system calls) upon attempted execution of instances 212, preventing an attack from having any real effect before crashing.

In various examples, configuration randomizer 204 and build environment 206 may implement keyed modification of kernel data structures when generating operating system kernel instances 214. Kernel data structures determine how an operating system arranges and uses memory internally. Memory analysis, in particular, depends on being able to recognize and decipher kernel data structures. Generally, memory analysis tools are not able to interpret the internal data structures of application software, yet these tools are widely used for reverse engineering (particularly malware), because so many of the resources and actions of an application go through the kernel. Similarly, malware (e.g., particularly stealth malware such as rootkits) modify kernel data in order to hide their presence or exploit the system. Both the techniques of memory analysis and rootkits require knowing the in-memory layout of internal kernel data. Kernel data structures are internal to the system and are not normally intended to be used by application software. They are allowed to, and often do, change without notice (e.g., when upgrading an operating system). As a result, kernel data structures may, in many cases, be modified without affecting and/or breaking applications during execution.

In various examples, build environment 206 may perturb the data structures in kernel source code based on a key, such as when generating operating system kernel instances 214. Modifications can include field ordering, padding length, and the values of key constants, such as the executable and linkable format (ELF) header markers commonly used to find executables mapped in memory. Build environment 206 may do so by modifying operating system source code 210 based on keys 207 from configuration randomizer 204 to generate modified kernel data structures in operating system kernel instances 214, which helps ensure that the kernel's use of the data structure is internally consistent.

Two low-level transformations may be implemented by build environment 206 and configuration randomizer 204 to generate instances 212: system call scrambling and application binary interface (ABI) randomization. System calls are the low-level mechanism for calling functions in the OS kernel. Any manipulation of the system by an application, such as writing a file or starting a process, often directly or indirectly uses system calls. Remote exploits (e.g., shellcode) often access system calls directly, rather than through a library. Application software, on the other hand, typically accesses system calls through a library, such as the C library.

System calls may be implemented using a system call table that maps system call numbers to kernel functions. System call conventions are similar to traditional function call conventions but have an additional parameter that can be manipulated, beyond calling-convention choices: the system call numbers. The use of the system call numbers provides a large space for creating system variants. On Linux, for example, there are less than 200 valid system call numbers out of a 16-bit space. Conservative permutations of register choices create about $2^{15}$ variants. On top of this, permuting the system call numbers may create more than 21800 variants, in certain examples.

Through deployment of instances 212 on runtime computing systems, a unique system call table may be generated on each runtime system, yielding, e.g., many bits of uniqueness (key space) and increasing the work of reverse engineering low-level libraries. Changing the system call table and other kernel binary interfaces may prevent many attack tools from executing on a runtime system at all, and it also breaks reverse engineering tools that rely on the system call table to deduce what a program will do during execution.

In various examples, system call scrambling may be based on a key (e.g., one of keys 207), and kernel headers and the system call table may be altered to enable automated modification of the system call architecture. A tool (e.g., a script) of build environment 206 may automatically modify the system call numbers in application and library source code 208 and/or operating system source code 210 based on the key (e.g., a randomly chosen binary number). In this way, the unique ABI of an operating system for a VM may have a randomized set of call numbers that differs from a published set of call numbers for the operating system. After modifying this code, build environment 206 automatically compiles instances 212. In some examples, build environment 206 may generate machine code by compiling instances 212. For instance, build environment 206 may compile a software application such that machine code generated by compiling the software application is configured to use call numbers in the randomized set of call numbers to perform system calls instead of call numbers in the published set of call numbers.

Further, build environment 206 may leave all the original system call numbers unused, which guarantees that any system call from unmodified code will immediately fail, since no standard system call number is valid. Furthermore, build environment 206 may incorporate into the compiled operating system tripwire code that generates alerts if any of the standard system calls, or system calls not in the modified set of system calls, are used. The large space of possible system call numbers and small number of valid system calls makes it difficult for an attacker to find a valid system call merely by chance. This modification approach may have minimal runtime cost, with little to no runtime cost for conservative scrambling choices.

Additionally, in certain examples, instances 212 may change the library, function ABI, and/or register behavior. Deployment of instances 212 may change the way in how common registers are used, such as the frame pointer that keeps track of the current stack frame's location. Each function call may have different, random offsets for values in certain locations. Application and library source code 208 and operating system source code 210 compiled using build environment 206 of FIG. 1 will automatically reference the correct data, but reverse engineering tools may fail.

Configuration randomizer 204 and build environment 206 may also be used to transform software ABIs by modifying function calling conventions used by one or more of instances 212. An ABI defines how binary software communicates with other software components, particularly libraries, and is determined at compile time. As one example, to an attacker inserting shellcode directly, such as through a memory corruption vulnerability, not knowing the ABI means the attacker cannot feasibly call other functions in the applications or libraries it uses. The attacker would need to interactively determine the ABI for each function he needs, a task that is difficult in size-limited shellcodes. Moreover, an attacker attempting to determine the ABI through a trial-and-error approach of testing system calls may cause a tripwire to generate an alert, shutting down the attack. By carefully choosing ABI transformations, return-oriented-programming (ROP) attacks may be thwarted, as well.

In various examples, ABI modifications may relate to how functions are called and how function parameters and function return value settings are passed. For example, certain standards pass arguments to the stack in right-to-left order, store the stack pointer in a particular register, and return a value in a particular register, while the stack is cleaned up by the caller. Which registers are used and in what order parameters are place on the stack may, in many cases, be an arbitrary choice. By manipulating the arbitrary choices so that they are different from the standard and specific to a particular key (e.g., one of keys 207), the deployment of software written for a standard ABI or for a different key's ABI will produce aberrant behavior, while the deployment of instances 212 will execute properly. Moreover, a tripwire may generate an alert in response to using the standard arrangement of function parameters and/or function return value settings. With conservative approaches on 32-bit systems, there are at least 48 different calling conventions created by modifying parameter order, saved stack pointer and return value registers, and register parameters. This can, in some cases, be expanded significantly by performing more aggressive modifications. The key space is much larger for 64-bit systems, since there are many more registers available.

In some examples, such as in the example shown in FIG. 4 and described below in this disclosure, LLVM may be augmented to automatically modify the ABI based on a key, such as one of keys 255. This approach may be similar in architecture to existing code-obfuscation or software security modules for LLVM, and this may result in little to no changes to the source code of software to be compiled, according to some examples.

In some examples, instances 212 that are installed (e.g., deployed) in a VM are not only randomized based upon the inputs provided to build environment 206 by configuration randomizer 204, but they are also capable, once deployed, to provide fabricated and/or false configuration information to potential attackers of the VM. The fabricated and/or false configuration information provided to potential attackers of the VM may be based on information provided by configuration randomizer 204 and/or plugins 220, which interface with plugin API 205 of configuration randomizer 204. The techniques described herein may utilize one or more host-level approaches to deceive attackers by providing such fabricated information. For example, upon deployment of instances 212 in a runtime system, the runtime system may use network proxies or Transmission Control Protocol (TCP)/Internet Protocol (IP) stack changes to thwart OS fingerprinting activities of a remote attacker. As another non-limiting example, the runtime system may provide stub network services from operating systems or configurations that are not actually in use. As further examples, the runtime system may fabricate system configuration information in protocols (e.g., Hypertext Transfer Protocol (HTTP)) that provide it, and/or fabricate user-agent strings in web browsers. Various other types of data fabrication or falsification may be achieved through implementation of the techniques described herein, as will be further described below.

In various examples, configuration randomizer 204 is configured to build scripts. Configuration randomizer 204 includes plugin API 205 for specifying how to alter a given application's configuration, or to select among alternative applications, in a functionality-preserving way. For instance, either nginx or Apache could be used to serve static web pages and the script would select one at random according to a key (e.g., one of keys 207). At a deeper level, in some non-limiting examples, the key could force patches in the operating system's TCP/IP stack, such as to its sequence number generation algorithm, which would confuse remote fingerprinting tools like nmap.

As part of this task, plugin API 205 of configuration randomizer 204 may permute configurations or select among alternative applications. Generally, the use of plugin API 205 may, in various examples, involve patching source code, text files, or other configuration data. One or more plugins 220 may interface with plugin API 205 of configuration randomizer. Plugins 220 may be used for creating configuration information, such as, in some examples, false configuration information. For instance, as one non-limiting example, an individual plugin of plugins 220 may contain a source code patch for a nginx web server that causes it to report itself as Apache in its Server: headers. Other plugins of plugins 220 could enable or disable otherwise-unused functionality. Through the use of plugin API 205, system managers can create re-usable components for common items.

Figure 4:
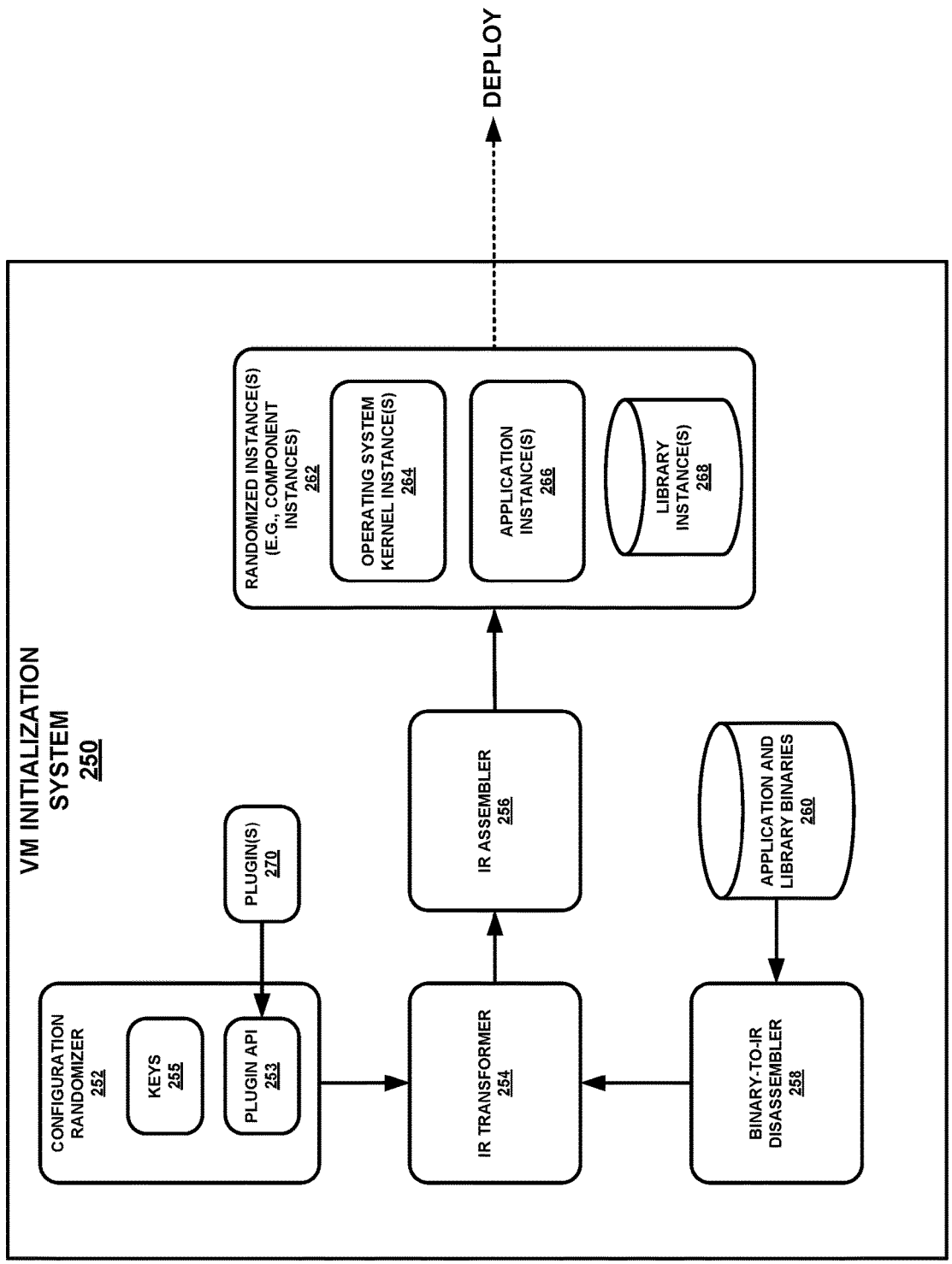
FIG. 4 is a block diagram illustrating another example VM initialization system that is configured to deploy randomized operating system kernel, application, and/or library instances, in accordance with one or more aspects of the present disclosure.

FIG. 4 is a block diagram illustrating another example VM initialization system 250 that is configured to deploy randomized operating system kernel, application, and/or library instances, in accordance with one or more aspects of the present disclosure. VM initialization system 250 may be an example of VM initialization system 109 (FIG. 2), or form part one of host managers 22 (FIG. 1), or another software unit in distributed computing system 10 (FIG. 1). As shown in FIG. 4, VM initialization system 250 includes configuration randomizer 252, plugins 270, keys 255, Intermediate Representation (IR) transformer 254, IR assembler 256, binary-to-IR disassembler 258, application and library binaries 260, and randomized instances 262. Randomized instances 262 may, upon generation, may be deployed on one or more VMs.

Similar to randomized instances 212 shown in FIG. 3, randomized instances 262 shown in FIG. 4 may comprise one or more instances of software components, such as, for example, one or more instances of applications and/or operating systems/kernels. For instance, randomized instances 262 may include one or more operating system kernel instances 264, one or more application instances 266, and one or more library instances 268.

In cases where source code (e.g., application and library source code 208, operating system source code 210 shown in FIG. 3) is not accessible or otherwise available, the techniques of the present disclosure can utilize binary-to-IR disassembler 258 to generate, from application and library binaries 260, IR, such as LLVM IR. IR may, in various examples, comprise bitcode having a platform-independent binary format. Binary-to-IR disassembler 258 may be configured to disassemble application and library binaries 260 and generate IR bitcode. IR transformer 254 then transforms the IR provided by binary-to-IR disassembler 258 based on one or more of keys 255 provided by configuration randomizer 252. In many examples, configuration randomizer 252 may function similarly to configuration randomizer 204 shown in FIG. 3. Plugins 270 may be similar to plugins 220 shown in FIG. 3, and plugin API 253 may be similar to plugin API 205. However, in the example of FIG. 4, IR transformer 254 is configured to utilize keys 255, which may be similar to keys 207 in FIG. 3, to perform binary transformations on the IR provided by binary-to-IR disassembler 258. IR transformer 254, in certain cases, may include code and/or one or more scripts.

The transformed IR provided by IR transformer 254 is then re-assembled by IR assembler 256 into executable form comprising randomized instances 262. Randomized instances 262 include one or more operating system kernel instances 264, one or more application instances 266, and one or more library instances 268. Each of randomized instances 262 may be deployed onto a runtime computing system.

Referring to both the examples of FIG. 3 and FIG. 4, in some examples, the techniques of the present disclosure use fine-grained address space layout randomization (ASLR), reordering source code segments at the function level (or smaller) throughout the executable address space of a library or an application, and also, in some cases, inserting non-executable memory pages between functions. This causes exploits based on particular code offsets (e.g., after discovering a library's base address), during execution of one or more of instances 212 (FIG. 3) and/or one or more of instances 262 (FIG. 4) on a runtime system, to immediately fault and crash. Similarly, using stack layout manipulation, the order and alignment of data on the stack is permuted and guard data may be inserted, which may cause stack-based memory corruption to have inconsistent behavior or outright fail. The compiler and/or linker of build environment 206, for example, can manipulate symbols, causing exploits that attempt to find a function or memory location (e.g., in a dynamically linked library (DLL)), using its symbol name, to fail during execution of one or more of instances on a runtime system. In addition, the library/function ABI may be altered by build environment 206 on a per-function basis instead of a program basis.

In certain examples, instances 212 (FIG. 3) generated by build environment 206 implement fine-grained address space layout randomization (ASLR). In these examples, configuration randomizer 204 and build environment 206 can generate one or more of instances 212 by inserting non-executable gaps in one or more of instances 212, which may force faults upon attempted execution. For example, one or more of instances 212 may include non-executable gaps in a loaded library as "guard pages" to force faults if any unauthorized code assumes standard library layouts. Additionally, in accordance with one or more techniques of this disclosure, a tripwire may generate an alert if code attempts to access the non-executable gaps in the loaded library. This may thwart common attacks to system-wide, coarse-grained ASLR where the attacker learns the address of a known function in a standard library, then computes the address of a desired function as an offset from the known location. Such offsets will be invalid in fine-grained ASLR and will result in execution faults. Most application and library code is amenable to such transformations by configuration randomizer 204 and build environment 206, already being compiled as position-independent code (PIC), as PIC is often required for dynamic linking.

In certain examples, the transformations may be implemented through one or more of LLVM or runtime dynamic linker changes for a runtime environment. In some cases, LLVM backend modules may be used, and, in some cases, modifications to runtime dynamic linkers may be implemented to make different ASLR layouts for each runtime invocation of a library. The LLVM-only technique makes different ASLR layouts for each instance of a library.

In various examples, two types of fine-grained library transformations may be utilized: stack layout manipulation and symbol manipulation. Stack layout manipulation helps detect and prevent stack-based attacks ("stack smashing") by reordering local variables on the stack and inserting space between them. If significant growth in the stack size is permissible, or there are relatively few local variables and the stack is small, build environment 206 can generate one or more of instances 212 that, upon execution, can insert un-writable pages of memory within the stack. Any attempts to "smash" the stack by overrunning a variable may trigger a hardware fault and crash instances upon attempted execution. Additionally, in accordance with one or more techniques of this disclosure, any attempts to "smash" the stack may cause a tripwire to generate an alert, thereby causing failover to a clean VM. To reduce potential run-time overhead associated with this technique, in some cases, stack layout manipulations can be restricted to only functions that handle user input or other untrusted data.

Symbol manipulation may be implemented to thwart an attacker's attempted use of certain standard library calls (e.g., dlopen( ) and dlsym( ) to load a library by hand and use functions within it. Build environment 206 may generate one or more instances of instances 212 that have instance-specific but internally consistent tables mapping original library function names to new names. Coupled with fine-grained ASLR, these names may be in a different order, which may prevent the attacker from using the index of a function within a library as a proxy for its name. These transformations can be applied at build time (e.g., FIG. 3) or at transform time (e.g., FIG. 4). The net effect is that an application's call to a standard library function may cause, for example, the linker to actually look up another function instead. In the case where a standard library function is called with a string constant for the desired function name, the present techniques could detect this (e.g., at LLVM IR level, see FIG. 2) and make the appropriate mapping at build time.

Figure 5:
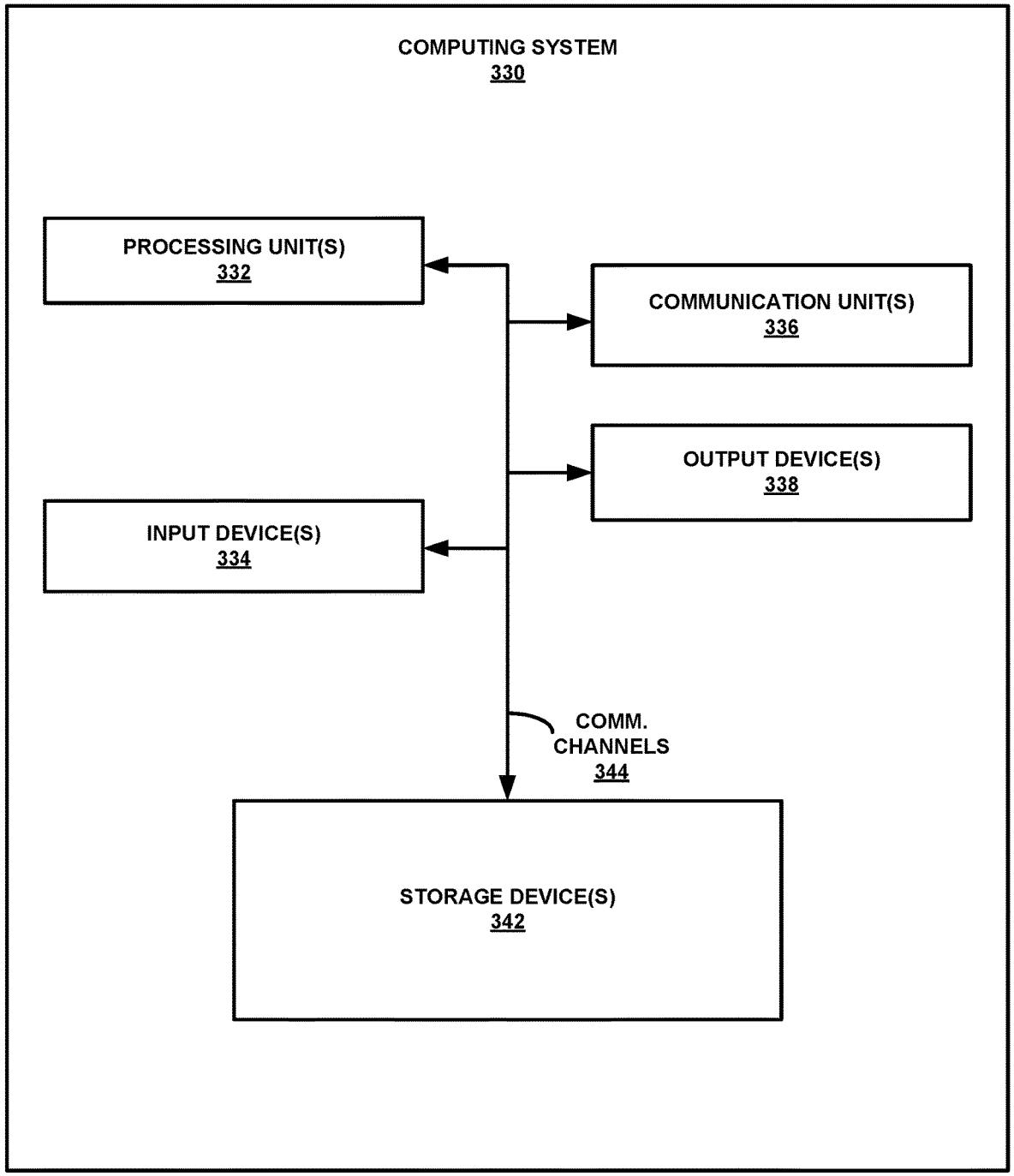
FIG. 5 is a block diagram illustrating further details of an example computing system, in accordance with one or more aspects of the present disclosure.

FIG. 5 is a block diagram illustrating further details of an example computing system 330, such as host devices 18, persistent storage node 16, dispatcher nodes, user devices 28 in FIG. 1, in accordance with one or more aspects of the present disclosure. FIG. 5 illustrates only one particular example of computing system 330, and many other examples of computing system 330 may be used in other instances and may include a subset of the components shown, or may include additional components not shown, in FIG. 5.

As shown in the example of FIG. 5, computing system 330 includes one or more processing units 332, one or more input devices 334, one or more communication units 336, one or more output device 338, and one or more storage devices 342. Communication channels 344 may interconnect each of the components 332, 334, 336, 138, and 142 for inter-component communications (physically, communicatively, and/or operatively). In some examples, communication channels 344 may include a system bus, a network connection, an inter-process communication data structure, or any other method for communicating data between hardware and/or software.

One or more input devices 334 of computing system 330 may receive input. Examples of input are tactile, audio, and video input. Examples of input devices 334 include a presence-sensitive screen, touch-sensitive screen, mouse, keyboard, voice responsive system, video camera, microphone or any other type of device for detecting input from a human or machine.

One or more output device 338 of computing system 330 may generate output. Examples of output are tactile, audio, and video output. Examples of output device 338 include a presence-sensitive screen, sound card, video graphics adapter card, speaker, cathode ray tube (CRT) monitor, liquid crystal display (LCD), or any other type of device for generating output to a human or machine. Output device 338 may include display devices such as cathode ray tube (CRT) monitor, liquid crystal display (LCD), or any other type of device for generating tactile, audio, and/or visual output.

One or more communication units 336 of computing system 330 may communicate with one or more other computing systems or devices via one or more networks by transmitting and/or receiving network signals on the one or more networks. Examples of communication unit 336 include a network interface card (e.g. such as an Ethernet card), an optical transceiver, a radio frequency transceiver, or any other type of device that can send and/or receive information, such as through a wired or wireless network. Other examples of communication units 336 may include short wave radios, cellular data radios, wireless Ethernet network radios, as well as universal serial bus (USB) controllers. Communication units 336 may provide wired and/or wireless communication.

One or more storage devices 342 within computing system 330 may store information for processing during operation of computing system 330 (e.g., computing system 330 may store data accessed by one or more modules, processes, applications, or the like during execution at computing system 330). In some examples, storage devices 342 on computing system 330 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 342, in some examples, also include one or more computer-readable storage media. Storage devices 342 may be configured to store larger amounts of information than volatile memory. Storage devices 342 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 342 may store program instructions and/or data associated with one or more software/firmware elements or modules.

For example, when computing system 330 comprises an example of a host device, such as one of host devices 18 (FIG. 1), storage devices 342 may store application and library source code 208 (FIG. 2), as well as operating system source code 210 (FIG. 2). In addition, storage devices 342 may store instructions and/or data associated with host managers 22, VMs 20, core application 104, system administration unit 106, session manager 108, hypervisor 110, disposable VM 112, guest OS 114, applications 116 of FIG. 2, configuration randomizer 204, keys 207, build environment 206, and randomized instances 212 of FIG. 3.

As another example, when computing system 330 comprises an example of device hosting VM initialization system 250 of FIG. 4, storage devices 342 may store application and library binaries 260. In addition, storage devices 342 may store instructions and/or data associated with plugins 270, configuration randomizer 252, IR transformer 254, IR assembler 256, binary-to-IR disassembler 258, and randomized instances 262.

Computing system 330 further includes one or more processing units 332 that may implement functionality and/or execute instructions within computing system 330. For example, processing units 332 may receive and execute instructions stored by storage devices 342 that execute the functionality of the elements and/or modules described herein. These instructions executed by processing units 332 may cause computing system 330 to store information within storage devices 342 during program execution. Processing units 332 may also execute instructions of the operating system to perform one or more operations described herein.

Figure 6:
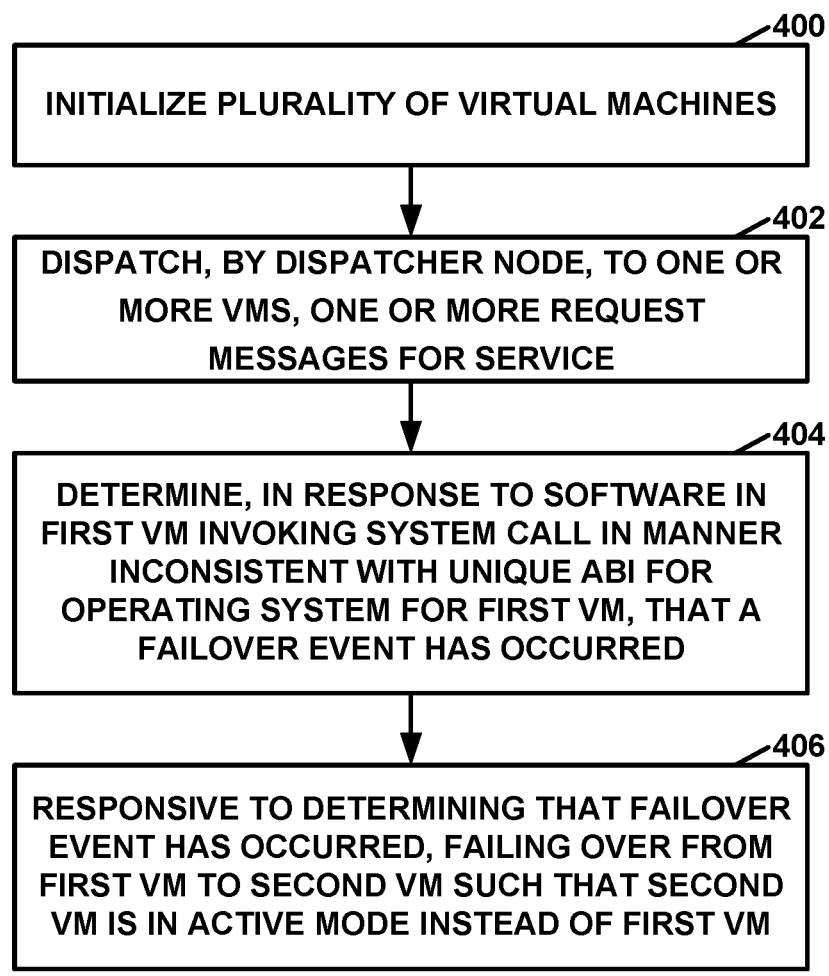
FIG. 6 is a flow diagram illustrating an example process that may be performed by a computing system, in accordance with one or more aspects of the present disclosure.

FIG. 6 is a flow diagram illustrating an example process that may be performed by a computing system, in accordance with one or more aspects of the present disclosure. For example, the process illustrated in FIG. 6, which may comprise one or more operations, may be performed by one or more of the VM initialization systems shown in FIGS. 1-4.

As illustrated in the example process of FIG. 6, a distributed computing system, such as distributed computing system 10, initializes a plurality of VMs configured to provide a service (400). In some examples, host managers in a plurality of clusters initialize the plurality of VMs. More specifically, in the examples of FIG. 2, FIG. 3, and FIG. 4, VM initialization system 109, VM initialization system 200, and VM initialization system 250, respectively, may initialize the plurality of VMs, as described elsewhere in this disclosure. In the example of FIG. 6, the distributed computing system (e.g., a first host device of the distributed computing system) hosts a first VM of the plurality of VMs and the distributed computing system (e.g., a second host device of the distributed computing system) hosts a second VM of the plurality of VMs. In this example, the first VM is in an active mode and the second VM is not in the active mode.

Figure 7:
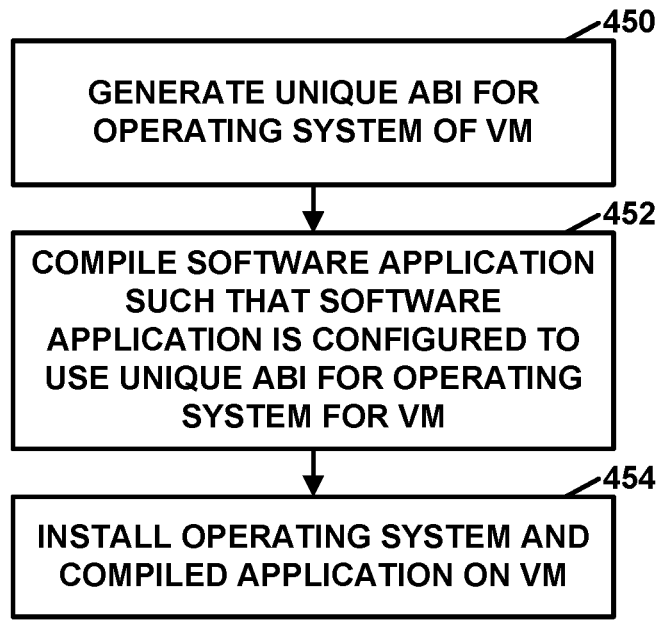
FIG. 7 is a flow diagram illustrating an example process for initializing a VM, in accordance with one or more aspects of this disclosure.

FIG. 7 is a flow diagram illustrating an example process for initializing a VM, in accordance with one or more aspects of this disclosure. As part of initializing the plurality of VMs, the distributed computing system may perform the operation of FIG. 7 for each respective VM of the plurality of VMs. As shown in the example of FIG. 7, the distributed computing system may generate a unique ABI for an operating system for the respective VM (450). Additionally, the distributed computing system may compile a software application such that the software application is configured to use the unique ABI for the operating system for the respective VM (452). In some examples, as part of generating the unique ABI for the operating system for the respective VM, the distributed computing system may replace a published set of call numbers for system calls of a published ABI of the operating system for the respective VM with a randomized set of call numbers. Additionally, in such examples, as part of compiling the software application, the distributed computing system may compile the software application such that machine code of the compiled software application is configured to use call numbers in the randomized set of call numbers to perform system calls instead of call numbers in the published set of call numbers. Other examples of how to generate the unique ABI for the operating system and how to compile software applications are provided elsewhere in this disclosure.

Furthermore, in the example of FIG. 7, the distributed computing system may install the operating system for the respective VM and the compiled software application on the respective VM (454). In some examples, for each respective VM of the plurality of VMs, the ABI for the operating system for the respective VM is different from the ABIs for the operating systems for each other VM of the plurality of VMs. In some examples, the distributed computing system may determine that a failover event has occurred based on one or more devices (e.g., host devices) determining that communication with the first host device has been lost. In this example, in response to the failover event, the distributed computing system may failover from the first VM to the second VM (or in the case where the second VM is in the active mode, to a third VM, which may be hosted by the first host device).

With continuing reference to the example of FIG. 6, the distributed computing system (e.g., a dispatcher node of the distributed computing system) may dispatch, to one or more VMs of the plurality of VMs that provide the service and are in the active mode, one or more request messages for the service (402). In some examples, the dispatcher node is a first dispatcher node and the distributed computing system initializes a plurality of dispatcher nodes such that each respective dispatcher node of the plurality of dispatcher nodes is configured to receive, from user devices, request messages for the service and to forward the request messages to one or more VMs of the plurality of VMs that are in the active mode. In this example, the plurality of dispatcher nodes includes the first dispatcher node.

Additionally, the distributed computing system (e.g., the first host device of the distributed computing system) may determine, in response to software in the first VM invoking a system call in a manner inconsistent with the unique ABI for the operating system of the first VM, that a failover event has occurred (404). For instance, the distributed computing system (e.g., the first host device of the distributed computing system) may determine, based on the software in the first VM using a call number in the published set of call numbers to invoke the system call, that the software in the first VM has invoked the system call in the manner inconsistent with the unique ABI for the operating system of the first VM.

Responsive to determining that the failover event has occurred, the distributed computing system may fail over from the first VM to the second VM such that the second VM is in the active mode instead of the first VM (406). In some examples, responsive to determining that the failover event has occurred, the distributed computing system (e.g., the first host device of the distributed computing system) may discard the first VM. In some examples, responsive to determining that the failover event has occurred, the distributed computing system does not discard the first VM, but may keep the first VM running but isolate the first VM from database 30 and other sensitive data. This may allow for additional opportunity to study the cyberattack.

Various examples of this disclosure may be used conjunctively or disjunctively. Thus, even though some combinations of examples are not expressly described, the combinations of such examples may be used. While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    initializing, by a distributed computing system, a plurality of virtual machines (VMs) configured to provide a service, wherein:
        the distributed computing system hosts a first VM of the plurality of VMs,
        the distributed computing system hosts a second VM of the plurality of VMs,
        the first VM is in an active mode and the second VM is not in the active mode,
        initializing the plurality of VMs comprises, for each respective VM of the plurality of VMs:
            generating a randomized instance of a software component for the respective VM using address-space layout randomization such that the randomized instance of the software component for the respective VM includes a set of one or more non-executable gaps; and
            installing the randomized instance of the software component for the respective VM on the respective VM;
    dispatching, by the distributed computing system, to one or more VMs of the plurality of VMs that provide the service and are in the active mode, one or more request messages for the service;
    determining, by the distributed computing system, in response to software in the first VM attempting to access data in the set of one or more non-executable gaps, that a failover event has occurred; and
    responsive to determining that the failover event has occurred, failing over, by the distributed computing system, from the first VM to the second VM such that the second VM is in the active mode instead of the first VM.

2. The method of claim 1, wherein the software component is an operating system kernel.

3. The method of claim 1, wherein the software component is a software application.

4. The method of claim 1, wherein the software component is a library instance.

5. The method of claim 1, wherein:
    the set of one or more non-executable gaps is a first set of one or more non-executable gaps,
    the software component is a first software component,
    the first software component and a second software component are different ones of: a operating system kernel, a software application, or a library,
    initializing the respective VM further comprises generating a randomized instance of the second software component for the respective VM using address-space layout randomization such that the randomized instance of the second software component includes a second set of one or more non-executable gaps, and
    determining that the failover event has occurred comprises determining, by the distributed computing system, in response to the software in the first VM attempting to access the data in the first set of one or more non-executable gaps or data in the second set of one or more non-executable gaps, that the failover event has occurred.

6. The method of claim 1, wherein:
    the distributed computing system comprises a first cluster and a second cluster, the first cluster including a first host device and a first persistent storage node, the second cluster including a second host device and a second persistent storage node,
    the first host device hosts the first VM,
    the second host device hosts the second VM;
    the method further comprising:
        prior to determining the failover event has occurred:
            storing, at the first persistent storage node, a first copy of a database, the first persistent storage node persisting the first copy of the database independently of the first VM;
            storing, at the second persistent storage node, a second copy of the database, the second persistent storage node persisting the second copy of the database independently of the second VM;
            receiving, by the first VM, a request message for the service;
            as part of processing the request message, generating, by the first VM, a database modification request;
            responsive to the database modification request, performing, at the first persistent storage node, a modification to the first copy of the database; and
            synchronizing the first copy and the second copy of the database; and
        responsive to determining the failover event has occurred, rolling back the modification to the database requested by the first VM.

7. The method of claim 1, wherein the method further comprises:
    automatically discarding and replacing, by the distributed computing system, VMs of the plurality of VMs according to a refresh policy.

8. The method of claim 1, further comprising:
    responsive to determining that the failover event has occurred, discarding, by the distributed computing system, the first VM.

9. A distributed computing system comprising:
a dispatcher node; and
one or more host devices configured to:
  initialize a plurality of virtual machines (VMs) configured to provide a service, wherein:
    the plurality of VMs includes a first VM and a second VM,
    the first VM is in an active mode and the second VM is not in the active mode,
    wherein the one or more host devices are configured such that, as part of initializing the plurality of VMs, the one or more host devices, for each respective VM of the plurality of VMs:
      generate a randomized instance of a software component for the respective VM using address-space layout randomization such that the randomized instance of the software component for the respective VM includes a set of one or more non-executable gaps; and
      install the randomized instance of the software component for the respective VM on the respective VM;
  wherein the dispatcher node is configured to distribute to one or more VMs of the plurality of VMs that provide the service and are in the active mode, one or more request messages for the service;
  wherein the distributed computing system is configured to determine, in response to software in the first VM attempting to access data in the set of one or more non-executable gaps, that a failover event has occurred; and
  wherein, responsive to determining that the failover event has occurred, the distributed computing system fails over from the first VM to the second VM such that the second VM is in the active mode instead of the first VM.

10. The distributed computing system of claim 9, wherein the software component is an operating system kernel.

11. The distributed computing system of claim 9, wherein the software component is a software application.

12. The distributed computing system of claim 9, wherein the software component is a library instance.

13. The distributed computing system of claim 9, wherein:
  the set of one or more non-executable gaps is a first set of one or more non-executable gaps,
  the software component is a first software component,
  the first software component and a second software component are different ones of: a operating system kernel, a software application, or a library,
  the one or more host devices are configured such that, as part of initializing the respective VM, the one or more host devices generate a randomized instance of the second software component for the respective VM using address-space layout randomization such that the randomized instance of the second software component includes a second set of one or more non-executable gaps, and
  the distributed computing system is configured such that, as part of determining that the failover event has occurred, the distributed computing system determines, in response to the software in the first VM attempting to access the data in the first set of one or more non-executable gaps or data in the second set of one or more non-executable gaps, that the failover event has occurred.

14. The distributed computing system of claim 9, wherein:
  the distributed computing system comprises a first cluster and a second cluster, the first cluster including a first host device and a first persistent storage node, the second cluster including a second host device and a second persistent storage node,
  the first host device hosts the first VM,
  the second host device hosts the second VM,
  the first persistent storage node is configured to store a first copy of a database, the first persistent storage node persisting the first copy of the database independently of the first VM,
  the second persistent storage node is configured such that the second persistent storage node stores a second copy of the database, the second persistent storage node persisting the second copy of the database independently of the second VM,
  the first VM is configured such that, prior to the failover event, the first VM:
    receives a request message for the service; and
    as part of processing the request message, generates a database modification request,
  the first persistent storage node is configured such that responsive to the database modification request, the first persistent storage node performs a modification to the first copy of the database,
  the first persistent storage node and the second persistent storage node are configured to synchronize the first copy and the second copy of the database, and
  responsive to determining the failover event has occurred, the first and second persistent storage nodes are configured to roll back the modification to the database requested by the first VM.

15. The distributed computing system of claim 9, wherein the one or more host devices are configured to:
  automatically discard and replace VMs of the plurality of VMs according to a refresh policy.

16. The distributed computing system of claim 15, wherein the one or more host devices are configured such that, as part of automatically discarding and replacing the VMs according to the refresh policy, the one or more host devices:
  automatically discard and replace a VM of the plurality of VMs after the VM has completed processing a particular number of transactions.

17. The distributed computing system of claim 9, wherein the distributed computing system is configured to discard the first VM in response to determining that the failover event has occurred.

18. The distributed computing system of claim 9, wherein:
  the dispatcher node is a first dispatcher node,
  the distributed computing system comprises a plurality of dispatcher nodes, the plurality of dispatcher nodes including the first dispatcher node,
  each respective dispatcher node of the plurality of dispatcher nodes is configured to receive, from one or more user devices, at least one request message of the one or more request messages and to forward the respective at least one request message to one or more VMs of the plurality of VMs that are in the active mode.

19. A computer-readable data storage medium having instructions stored thereon that, when executed, configure a distributed computing system to:

initialize a plurality of virtual machines (VMs) configured to provide a service, wherein:
  the plurality of VMs includes a first VM and a second VM,
  the first VM is in an active mode and the second VM is not in the active mode,
  the instructions configure the distributed computing system such that, as part of initializing the plurality of VMs, the distributed computing system, for each respective VM of the plurality of VMs:
    generates a randomized instance of a software component for the respective VM using address-space layout randomization such that the randomized instance of the software component for the respective VM includes a set of one or more non-executable gaps; and
    installs the randomized instance of the software component for the respective VM on the respective VM;
dispatch, to one or more VMs of the plurality of VMs that provide the service and are in the active mode, one or more request messages for the service;
determine, in response to software in the first VM attempting to access data in the set of one or more non-executable gaps, that a failover event has occurred; and
responsive to determining that the failover event has occurred, fail over, by the distributed computing system, from the first VM to the second VM such that the second VM is in the active mode instead of the first VM.

20. The computer-readable data storage medium of claim 19, wherein:
  the set of one or more non-executable gaps is a first set of one or more non-executable gaps,
  the software component is a first software component,
  the first software component and a second software component are different ones of: a operating system kernel, a software application, or a library,
  the instructions configure the distributed computing system such that, as part of initializing the respective VM, the distributed computing system generates a randomized instance of the second software component for the respective VM using address-space layout randomization such that the randomized instance of the second software component includes a second set of one or more non-executable gaps, and
  the instructions configure the distributed computing system such that, as part of determining that the failover event has occurred, the distributed computing system determines, in response to the software in the first VM attempting to access the data in the first set of one or more non-executable gaps or data in the second set of one or more non-executable gaps, that the failover event has occurred.

* * * * *